US009278833B2

(12) United States Patent
Maynard et al.

(10) Patent No.: US 9,278,833 B2
(45) Date of Patent: *Mar. 8, 2016

(54) LIFTING DEVICE EFFICIENT LOAD DELIVERY, LOAD MONITORING, COLLISION AVOIDANCE, AND LOAD HAZARD AVOIDANCE

(71) Applicant: Trimble Navigation Limited, Sunnyvale, CA (US)

(72) Inventors: Kurtis L. Maynard, Gainesville, GA (US); John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,214

(22) Filed: Nov. 22, 2013

(65) Prior Publication Data

US 2014/0081538 A1 Mar. 20, 2014

Related U.S. Application Data

(63) Continuation of application No. 13/017,232, filed on Jan. 31, 2011, now Pat. No. 8,618,949.

(60) Provisional application No. 61/300,360, filed on Feb. 1, 2010.

(51) Int. Cl.

| | |
|---|---|
| ***G08B 21/00*** | (2006.01) |
| ***B66C 15/04*** | (2006.01) |
| ***G01C 21/00*** | (2006.01) |
| ***B66C 13/46*** | (2006.01) |

(52) U.S. Cl.

CPC ............... *B66C 15/045* (2013.01); *B66C 13/46* (2013.01); *B66C 15/04* (2013.01); *G01C 21/00* (2013.01)

(58) Field of Classification Search

CPC ........................................................ B60C 15/06
USPC .................... 340/685, 539.1, 539.22, 539.25; 701/468, 469, 50; 212/276–281
See application file for complete search history.

(56) References Cited

U.S. PATENT DOCUMENTS 3,512,657 A 5/1970 Chambers
3,677,507 A 7/1972 Kendall et al.
(Continued)

FOREIGN PATENT DOCUMENTS

DE 102009016366 12/2009
EP 2520532 A1 11/2012
(Continued)

OTHER PUBLICATIONS

"International Search Report and Written Opinion", ISA/US, Jan. 12, 2012, 12 pages.

*Primary Examiner* — Jeffery Hofsass

(57) ABSTRACT

A lifting device sensor unit comprising a housing, a load monitor, and a wireless transceiver. The housing is configured to removably couple about a load line of a lifting device. The load monitor is coupled with the housing and configured for monitoring a load coupled with the load line, including monitoring a load position and a load orientation of the load. The wireless is transceiver coupled with the housing and configured for wirelessly providing information including the load position and the load orientation to a display unit located apart from the sensor unit.

39 Claims, 18 Drawing Sheets

(56) References Cited

U.S. PATENT DOCUMENTS

| | | | |
|---|---|---|---|
| 3,823,395 | A | 7/1974 | Rigney et al. |
| 5,231,678 | A | 7/1993 | Takatori et al. |
| 5,404,661 | A | 4/1995 | Sahm et al. |
| 5,848,485 | A | 12/1998 | Anderson et al. |
| 5,862,501 | A | 1/1999 | Talbot et al. |
| 6,665,613 | B2 | 12/2003 | Duvall et al. |
| 6,744,372 | B1 | 6/2004 | Shaw et al. |
| 6,826,452 | B1 | 11/2004 | Holland et al. |
| 6,894,621 | B2 | 5/2005 | Shaw |
| 7,032,943 | B1 | 4/2006 | Marler |
| 7,203,525 | B2 | 4/2007 | Dieringer et al. |
| 7,339,883 | B2 | 3/2008 | Santhoff et al. |
| 7,367,464 | B1 | 5/2008 | Agostini et al. |
| 7,472,009 | B2 | 12/2008 | Baldwin |
| 7,755,541 | B2 | 7/2010 | Wisherd et al. |
| 7,848,861 | B2 | 12/2010 | Pollock et al. |
| 7,957,833 | B2 | 6/2011 | Beucher et al. |
| 8,311,738 | B2 | 11/2012 | Politick et al. |
| 8,496,279 | B2 | 7/2013 | Aoki et al. |
| 8,618,949 | B2 | 12/2013 | Maynard et al. |
| 8,682,541 | B2 | 3/2014 | Best et al. |
| 8,768,609 | B2 | 7/2014 | Maynard et al. |
| 9,067,767 | B2 | 6/2015 | Maynard et al. |
| 2003/0060938 | A1 | 3/2003 | Duvall |
| 2006/0085118 | A1 | 4/2006 | Baldwin |
| 2006/0194604 | A1 | 8/2006 | Dieringer |
| 2007/0255494 | A1 | 11/2007 | Politick et al. |
| 2007/0282482 | A1 | 12/2007 | Beucher et al. |
| 2008/0036178 | A1 | 2/2008 | Slaubaugh et al. |
| 2008/0125942 | A1 | 5/2008 | Tucker et al. |
| 2008/0177450 | A1 | 7/2008 | Daniel |
| 2008/0191937 | A1 | 8/2008 | Wisherd et al. |
| 2008/0291031 | A1 | 11/2008 | Chen et al. |
| 2009/0055039 | A1 | 2/2009 | Pollock et al. |
| 2009/0295178 | A1 | 12/2009 | Corcoran |
| 2010/0070179 | A1 | 3/2010 | Cameron |
| 2010/0214094 | A1 | 8/2010 | Givens et al. |
| 2011/0076130 | A1 | 3/2011 | Stocker et al. |
| 2012/0185081 | A1 | 7/2012 | King et al. |
| 2014/0081534 | A1 | 3/2014 | Maynard et al. |
| 2014/0081535 | A1 | 3/2014 | Maynard et al. |
| 2014/0081537 | A1 | 3/2014 | Maynard et al. |
| 2014/0081538 | A1 | 3/2014 | Maynard et al. |
| 2014/0149004 | A1 | 5/2014 | Best et al. |

FOREIGN PATENT DOCUMENTS

| | | | |
|---|---|---|---|
| FR | 2921954 | A1 | 4/2009 |
| JP | 2010-036074 | | 2/1998 |
| JP | 10036074 | A | 2/1998 |
| JP | 2001-247289 | | 9/2001 |
| JP | 2005-528049 | | 9/2005 |
| JP | 2008-247604 | | 10/2008 |
| KR | 2002-0044203 | | 6/2002 |
| WO | 2009091256 | A1 | 7/2009 |

LIFTING DEVICE EFFICIENT LOAD DELIVERY, LOAD MONITORING, COLLISION AVOIDANCE, AND LOAD HAZARD AVOIDANCE

CROSS-REFERENCE TO RELATED U.S. APPLICATIONS—CONTINUATION

This application is a continuation application of and claims the benefit of co-pending U.S. patent application Ser. No. 13/017,232 filed on Jan. 31, 2011, entitled "Lifting Device Efficient Load Delivery, Load Monitoring, Collision Avoidance, and Load Hazard Avoidance" by Kurt Maynard et al., and assigned to the assignee of the present application; the disclosure of which is hereby incorporated herein by reference in its entirety.

The application with Ser. No. 13/017,232 filed on Jan. 31, 2011, entitled "Lifting Device Efficient Load Delivery, Load Monitoring, Collision Avoidance, and Load Hazard Avoidance" by Kurt Maynard et al., claims the benefit of and claims priority to provisional patent application Ser. No. 61/300,360, entitled "LIFTING DEVICE EFFICIENT LOAD DELIVERY, LOAD MONITORING, COLLISION AVOIDANCE, AND LOAD HAZARD AVOIDANCE," with filing date Feb. 1, 2010, assigned to the assignee of the present application; provisional patent application 61/300,360 was incorporated by reference in its entirety into application Ser. No. 13/017,232. This application claims priority to and benefit of provisional patent application 61/300,360 through patent application Ser. No. 13/017,232.

CROSS-REFERENCE TO RELATED U.S. APPLICATIONS

This application is also related to co-pending U.S. patent application Ser. No. 13/017,320 filed on Jan. 31, 2011, entitled "Sensor Unit System" by Kurt Maynard et al., and assigned to the assignee of the present application.

This application is also related to co-pending U.S. patent application Ser. No. 13/708,843 filed on Dec. 7, 2012, entitled "Sensor Unit System" by Gregory C. Best et al., and assigned to the assignee of the present application.

This application is also related to co-pending U.S. patent Divisional application Ser. No. 14/088,167 filed on Nov. 22, 2013, entitled "Lifting Device Efficient Load Delivery, Load Monitoring, Collision Avoidance, and Load Hazard Avoidance" by Kurt Maynard et al., and assigned to the assignee of the present application.

This application is also related to co-pending U.S. patent Divisional application Ser. No. 14/088,179 filed on Nov. 22, 2013, entitled "Lifting Device Efficient Load Delivery, Load Monitoring, Collision Avoidance, and Load Hazard Avoidance" by Kurt Maynard et al., and assigned to the assignee of the present application.

This application is also related to co-pending U.S. patent Divisional application Ser. No. 14/088,195 filed on Nov. 22, 2013, entitled "Lifting Device Efficient Load Delivery, Load Monitoring, Collision Avoidance, and Load Hazard Avoidance" by Kurt Maynard et al., and assigned to the assignee of the present application.

This application is also related to co-pending U.S. patent Continuation application Ser. No. 14/088,206 filed on Nov. 22, 2013, entitled "Lifting Device Efficient Load Delivery, Load Monitoring, Collision Avoidance, and Load Hazard Avoidance" by Kurt Maynard et al., and assigned to the assignee of the present application.

BACKGROUND

When using a lifting device, such as for example, a crane, it is often very difficult or impossible for an operator to see the area around and below the load that is being lifted, moved, or positioned by the lifting device. As but one example, some lifts are blind to an operator of the lifting device, such as when a load is dropped into a hole. As such, it is difficult and sometimes dangerous to perform lift activities. This is because the lifting device operator cannot see the position of the load, and the hazards that might hit or be hit by the load. Even routine lifts, where a lifting device operator can view the load, can be complicated by diminished situational awareness regarding the position of the load and/or potential hazards in the vicinity of the load.

Additionally, a job site or work area often has more than one lifting device in operation at any given time. As lifting devices are often in movement and require immense concentration to operate, it can be difficult for an operator to constantly determine if there is adequate clearance to prevent collision of some portion of his lifting device or load with a portion of another lifting device or another lifting device's load.

Furthermore, having real time knowledge of the absolute position and orientation of the load, in coordination with a mapped or modeled job site, can facilitate and increase the efficiency of delivering this load to the coordinates of the desired destination.

SUMMARY

A lifting device sensor unit is disclosed. In one embodiment, the sensor unit comprises a housing configured to removably couple about a load line of a lifting device. A first global navigation satellite system (GNSS) receiver is coupled with the housing and is configured for determining a sensor unit position in three dimensions. A load monitor is coupled with the housing and is configured for monitoring a load coupled with the load line, including monitoring a load position and a load orientation of the load. A wireless transceiver is coupled with the housing and is configured for wirelessly providing information including the load position, the load orientation, and the sensor unit position, to a display unit located apart from the sensor unit.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Figure 1A:
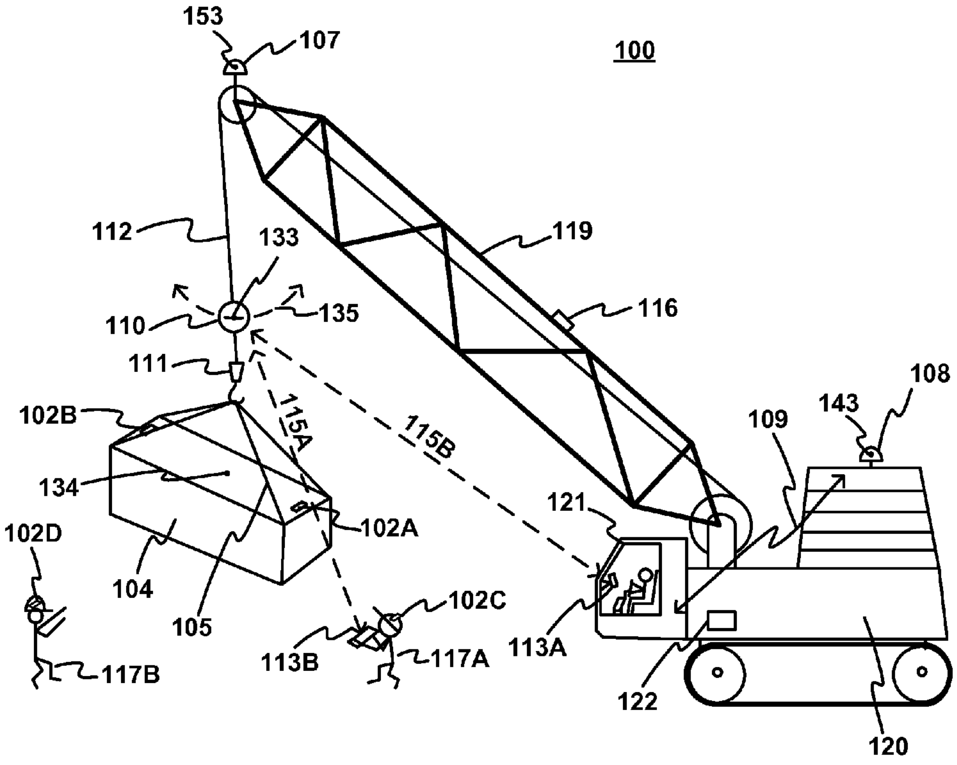
FIG. 1A is a diagram of an example lifting device sensor system in place on a lifting device, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "determining," "monitoring," "providing," "initiating," "generating," "wirelessly communicating," "wirelessly acquiring," "wirelessly providing," "accessing," "communicating," or the like, often (but not always) refer to the actions and processes of a computer system or similar electronic computing device such as, but not limited to, a display unit and/or a lifting device sensor unit or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

The term "lifting device" is used often herein. By "lifting device" what is meant is a device that utilizes a load line to lift a load. Some non-limiting examples of lifting devices include a jib crane, gantry crane, derrick crane, boom crane (telescoping or fixed), wheel mounted crane, truck mounted crane, crawler mounted crane, overhead crane, monorail carrier, straddle crane, tower crane, crane with a hoist but no boom, and a hoist. Typically a lifting device lifts a load with a hook or some attachment point located at a distal end/position of the load line with respect to a lifting point or arm to which it is attached. A load line is typically a cable, but in some a load line may comprise chain, rope, more than one cable, multiple sections of a single or multiple cables, or some combination thereof.

Overview of Discussion

Example units, systems, and methods for lifting device efficient load delivery, load monitoring, collision avoidance, and load hazard avoidance are described herein. Discussion begins with description of lifting device sensor unit and system shown coupled with two example lifting devices. Discussion continues with description of various components of an example sensor unit that may be used for one or more of: assisting in efficient load delivery, load monitoring, collision avoidance, and load hazard avoidance. Techniques of object identification in the vicinity of the load are described. Example displays of a lift plan and lifting device geofences are then discussed. Example methods of operation are discussed. Discussion then turns to description of an example GNSS receiver which may be used in various portions of the sensor unit and sensor system. An example computer system is then described, with which or upon which various components, method procedures, or portions thereof may be implemented. Implementations of an ad-hoc wireless personal area network are then discussed. Finally, an example communication network is described.

Example Lifting Device Sensor System

FIG. 1A is a diagram of an example lifting device sensor system 100 in place on a lifting device 120, in accordance with an embodiment. Lifting device sensor system 100 can be used to assist in or accomplish one or more of efficient load delivery, load monitoring, collision avoidance, and load hazard avoidance. It is appreciated that two or more of these functions may often overlap. In one embodiment, lifting device sensor system 100 comprises sensor unit 110 and one or more display units 113. Dashed lines 115A and 115B indicate wireless communication that occurs or can occur between sensor unit 110 and display unit(s) 113. Display unit 113 may be a dedicated display with a wireless transceiver or may be part of an electronic device such as smart phone, netbook, notebook computer, tablet computer, or the like. It is appreciated that sensor unit 110 is referred to herein in the generic sense as "sensor unit" or "lifting device sensor unit," and more particularly as "lifting device collision avoidance sensor unit," or "lifting device load hazard avoidance sensor unit." In some embodiments lifting device sensor system 100 further comprises: one or more global navigation satellite receivers (e.g., 108, 107) which are or may be coupled to portions of a lifting arm or a body of a lifting device, such as lifting device 120; and/or one or more object identifiers 102 that may be coupled to objects in a working area of lifting device 120. As will be discussed in greater detail below, in one embodiment, inertial sensors (e.g., 214 of FIG. 2A) of sensor unit 110 can be used to augment, or work in conjunction with, the GNSS receivers 107 and 108 and/or sensor unit 110 to provide lifting device sensor system 100 with positioning data. For example, during periods when the view to GNSS satellites may be temporarily obstructed, the inertial sensors can provide positioning data which permits lifting device sensor system 100 to continue determining the position of sensor unit 110 and/or portions of lifting device 120. As will be further described herein, in various embodiments sensor unit 110 is removably couplable with load line 112, other load lines of similar or different cross-sectional dimensions, and other load lines of similar or different configurations.

In FIG. 1A, GNSS receiver 108 is coupled to counterweights on the body (i.e., not on the lifting arm) of lifting device 120 and determines a position of point 143 in two or three dimensions. GNSS receiver 107 is coupled near the distal tip region of lifting arm 119 (a boom in this case) and determines a position of point 153 in two or three dimensions. It is appreciated that one or more of GNSS receivers 107 and 108 may wired or wirelessly communicate their determined positions (e.g., the positions of points 153 and 143) to operator cab 121 or to a component in operator cab 121 such as cab mounted display 113A. One such communication is illustrated by 109. Such positions may also be wirelessly communicated to components of sensor system 100, such as handholdable display unit 113B and/or sensor unit 110. Likewise, load information determined load cell 122 and/or lifting arm angle information determined by angle sensor/inclinometer 116 may be communicated to one or more components of sensor system 100 in the same or similar manner.

In FIG. 1A, object identifiers 102A and 102B are coupled to load 104 and identify information about load 104. Among other things, the information provided by load mounted objected identifiers may include information such as: what load 104 is (e.g., an I-beam); the orientation of load 104 (e.g., where the sides/ends are and/or which side/end belongs where at a final destination); and/or the lift destination for load 104. Object identifier 102C is located on the cap of person 117A and object identifier 102D is located on the helmet of person 117B. In various embodiments object identifiers may comprise mechanisms such as: Radio Frequency Identifiers (RFIDs); reflectors; bar codes; or some mix or combination thereof. Object identifiers facilitate identification, location, and/or tracking of one or more objects in the vicinity of a load in the viewing region beneath sensor unit 110. It is noted that in one embodiment, due to the nature of the components (e.g., positioning and communications technology) typically found on modern "smart" cellular telephones and Personal Digital Assistants (PDAs), the capability of providing an object identifier (e.g., object identifier 102C and 102D of FIG. 1A) can be provided using a cellular telephone, PDA, or similarly configured portable electronic having a suitable software application loaded onto it which enables it to be a part of, or communicatively coupled with, lifting device sensor system 100.

With continued reference to FIG. 1A, lifting device 120 includes an operator cab 121 from which an operator manipulates controls to lift a load 104 with lifting arm 119. In some embodiments, a lifting device that is configured differently than lifting device 120 may not include a cab, but may instead be operated with a handheld control box or in some other manner. Lifting device 120, in some embodiments, also includes one or more of: an angle sensor/inclinometer 116 for measuring an angle of lifting arm 119; and a load cell 122 for monitoring the presence, absence, and or weight of a load 104 on load line 112. As illustrated in FIG. 1A, rigging 105 is used to couple load 104 with a hook 111 located at a distal end of load line 112.

In FIG. 1A, point 133 represents a three dimensional position of sensor unit 110 that has been determined by a GNSS receiver (e.g., GNSS receiver 213A of FIG. 2) disposed in. Point 134 represents a three dimensional position of or on load 104 that has been determined by sensor unit 110. In some embodiments, a GNSS receiver (e.g., GNSS receiver 213A or 213B of FIG. 2A) of sensor unit 110 also determines an angular orientation 135 of point 133 or some other point on sensor unit 110. Such an angular orientation identifies a swinging component of sensor unit 110 that can occur as a result of sensor unit 110 being coupled with load line 112.

Figure 1B:
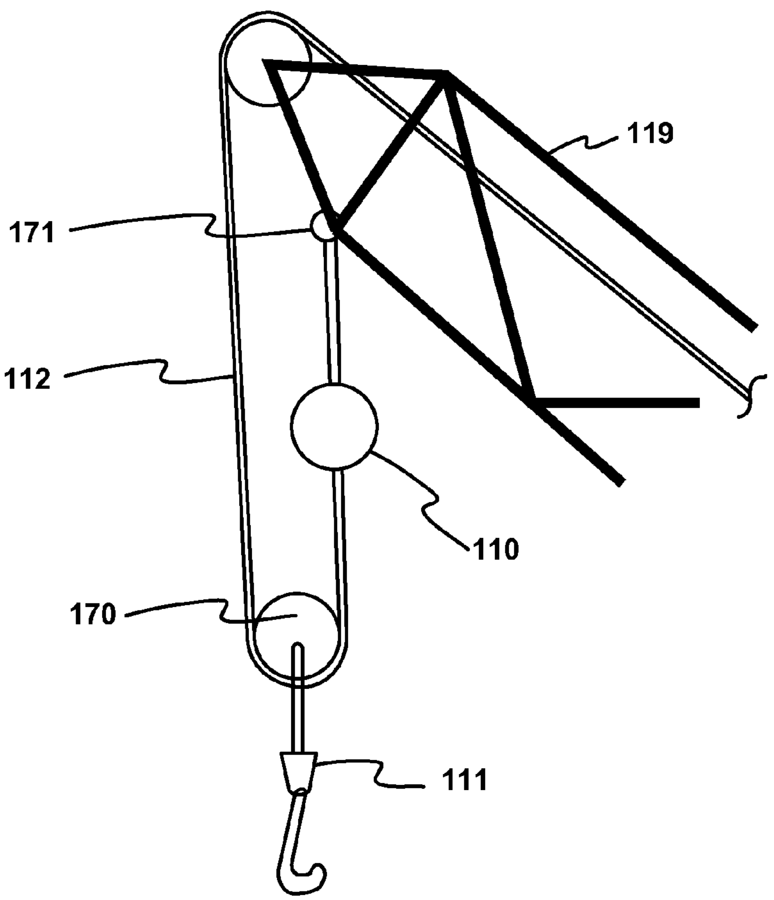
FIG. 1B shows an alternative coupling of a sensor unit of the sensor system with a lifting device load line, in accordance with an embodiment.

FIG. 1B shows an alternative coupling of sensor unit 110 of the sensor system 100 with a lifting device load line 112, in accordance with an embodiment. It is appreciated that FIG. 1B also illustrates only one of one of several other techniques for coupling a hook 111 or attachment point with a load line 112. In FIG. 1B, an end of load line 112 is fixedly coupled to lifting arm 119 at attachment point 171. Hook 111 is coupled with a pulley 170 that moveably rides upon load line 112 and is located at a gravity determined distal position (with respect to lifting arm 119) on load line 112.

Figure 2A:
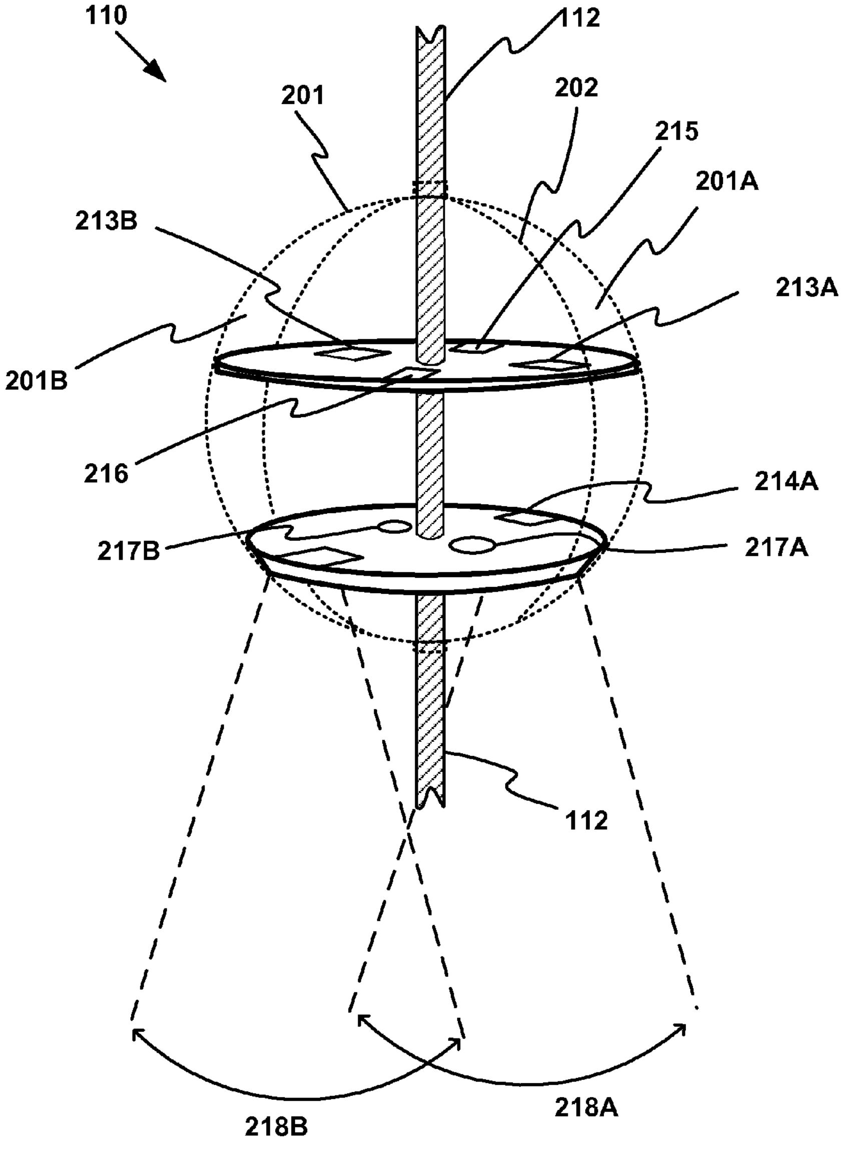
FIG. 2A is a diagram of a selection of sensor unit components coupled with a housing of a sensor unit, in accordance with an embodiment.

FIG. 2A is a diagram of a selection of sensor unit components coupled with a housing 201 of sensor unit 110, in accordance with an embodiment. As illustrated, in one embodiment, sensor unit 110 includes one or more GNSS receivers 213, one or more power sources 217, one or more load monitors 214, and one or more wireless transceivers 215. In some embodiments sensor unit 110 may also include one or more additional sensor unit components 216 (further described in FIG. 3). These components of sensor unit 110 are communicatively and/or electrically coupled with one another as required for performing functions of load monitoring, collision avoidance, and/or load hazard avoidance.

Housing 201 is configured to removably couple about a load line 112 of a lifting device. As depicted, this comprises housing 201 coupling about load line 112 at a location between load hook 111 (or other type of load attachment point in other embodiments) and the location where load line 112 meets the lifting device. In depicted embodiments housing 201 is substantially spherical, however other shapes are possible. Housing 201 is comprised of a rigid or semi-rigid material or materials. In one embodiment, all or a portion of housing 201 is made of an injection molded material such as high impact strength polycarbonate. In one embodiment at least a portion of housing 201 is transparent to GNSS satellite signals such that these signals can be received by GNSS receiver(s) 213A, 213B, which are couple with housing 201 and secured inside housing 201. In some embodiments housing 201 comprises a plurality of sections (e.g., hemispheres 201A, 201B) that join, fasten, latch, or otherwise couple with one another to form housing 201 and to removably couple about load line 112. Although two sections (hemispheres 201A, 201B) are illustrated, some embodiments may include more. As illustrated in FIG. 2A, hemispheres 201A and 201B removably couple with one another at joint 202.

Although housing 201 of sensor unit 110 is shown as being positioned above hook 111 on load line 112, in some embodiments, some of all of the functions/components of a sensor unit 110 may be built into or housed in lifting hook 111 or similar load attachment point/mechanism located on a distal end/portion of load line 112. One example of such an embodiment, is depicted in FIG. 2D.

With continued reference to FIG. 2A, the removably couplable characteristic of housing 201 facilitates field mounting and removal of sensor unit 110. In this manner, a construction company or crane rental company, for example, can flexibly utilize sensor unit 110 with a plurality of different lifting devices by moving sensor unit 110 from one lifting device load line to a load line of another lifting device. The removably couplable characteristic of housing 201 also facilitates the use of sensor unit 110 on lifting devices from a variety of manufacturers as no permanent mounting, hardwiring to the electrical system of the lifting device, or interfacing with the operating system of the lifting device is required.

Load monitor 214 (214A, 214B illustrated) are coupled with housing 201 and monitor a load 104 coupled with load line 112. This monitoring includes monitoring a load position and/or a load orientation of load 104. A load monitor may be a camera (e.g., a digital camera), a plurality of cameras, an ultrasonic sensor, a laser scanner, a bar code scanner, a radio frequency identification device transceiver, an inertial sensor (e.g., a gyroscope, accelerometer, mechanical accelerometer, an electro-mechanical accelerometer such as a Micro-Electro-Mechanical System (MEMS, etc.), or some combination of these. Load monitor(s) 214 typically face downward from sensor unit 110 toward load hook 111 to attain a field of view 218 (218A, 218B illustrated) that encompasses at least a portion of load 104 and typically some area in the surrounding vicinity of load 104. Through the use of object identifiers 102 (as illustrated in FIG. 1A), a load monitor 214 can track and locate object(s) marked with one or more object identifiers 102 as such objects enter or depart from a field of view 218. In some embodiments load monitor 214 performs ranging or positioning through use of photogrammetry, laser scanning, and/or ultrasonic measurement techniques in order to measure ranges to/and locations of objects in a field of view 218. In some embodiments, ranges/positions of objects in a field of view 218 are determined as an offset from a known three dimensional position of point 133 of sensor unit 110. In this manner, one or more positions with respect to a sensor unit 110 can be determined FIG. 1A illustrates one point 134, on load 104, for which a position has been determined in this fashion. However, in some embodiments, additional ranges/positions can be determined. For example, the ranges/positions of object identifiers 102A, 102B, 102C, and or 102D, can be determined when they are within one or more fields of view 218. Inertial sensors are used in one embodiment to augment, or work in conjunction with, the GNSS receivers 213 in determining the position of sensor unit 110 in three dimensions. The use of inertial sensors in sensor unit 110 allows lifting device sensor system 100 to continue positioning functions for periods of time when the view of GNSS satellites may be temporarily obstructed. The inertial sensors may also provide motion detection of sensor unit 110 for the purpose of initiating a shut-down sequence of one or more components of lifting device sensor system 100 to preserve their battery life when it is determined that sensor unit 110 has not moved for a selected period of time (e.g., five minutes, ten minutes, etc.). Alternatively, one or more of GNSS receivers 213 can be used to determine that sensor unit 110 has not moved for a period of time for the purpose of shutting down components of lifting device sensor system 100 to preserve their battery life.

In one embodiment, a load monitor 214 also monitors for load related hazards in a vicinity of load 104. A load related hazard is an object that is at risk of impacting with or being impacted by load 104. Such monitoring can be accomplished using range or position information that is determined regarding respective objects in one or more fields of view 218. Such objects may or may not be labeled with object identifiers 102. In some embodiments, load monitor 214 additionally or alternatively utilizes techniques such as facial recognition and/or infrared sensing to discern and monitor for persons 117 within a field of view 218.

It is appreciated that a field of view 218, and even overlapping fields of view (e.g., 218A, 218B, etc.), may have a blind spot beneath a load 104. In one embodiment, a load related hazard that may be monitored for is the loss of view, in or near the blind spot, of an object identifier (e.g., 102C, 102D as illustrated in FIG. 1A) associated with a person 117 or other object, or the loss of view of a person 117 that has been identified and monitored by other means.

Wireless transceiver 215 is coupled with housing 201. Wireless transceiver 215 may operate on any suitable wireless communication protocol including, but not limited to: WiFi, WiMAX, 802.11 family, cellular, two-way radio, and mesh networking. In one embodiment wireless transceiver 215 wirelessly provides information such as one or move of: load position (e.g., the position of point 134), load orientation, and/or a sensor unit position (e.g., the position of point 133) to a display unit 113 located apart from sensor unit 110. It is appreciated that other forms of information including, but not limited to, images, photos, video, lift plans, other object range/position information, object identification information, geofence information, collision alerts, and load hazard alerts can be provided wirelessly provided to a display unit 113 located apart from sensor unit 110. In some embodiments, wireless transceiver 215 communicates with one or more other sensor unit coupled with lifting devices that are within communication range. In some embodiments, wireless transceiver 215 communicates with one or more sensors or devices that are coupled with a lifting device, such sensors and devices include but are not limited to: a GNSS receiver (e.g., 107, 108, etc.), an angle sensor/inclinometer 116, and a load cell 122. For example, by communicating with load cell 122, load monitor 214 can receive information indicative of whether or not lifting device 120 has taken on or released a load 104. In some embodiments, this will allow load monitor 214 or other component(s) of sensor unit 110 to enter a low power energy conservation mode when a load 104 is not present in order to conserve power in power source(s) 217.

With continued reference to FIG. 2A, one or more power sources 217A, 217B are located inside housing 201. These power sources 217A, 217B couple with housing 201, and configured for providing electrical power for operating electrical components of sensor unit 110. These power sources 217 may comprise batteries, capacitors, or a combination thereof. Additionally, as described further below, these power sources 217 may be recharged by means of recharging contacts located on or accessible through the exterior surface of housing 201; and may be recharged by a power source charger that is coupled with housing 201 (as a part of sensor unit 110) and generates electrical power (e.g., through motion of sensor unit 110, through solar power production, or by other suitable power generation process).

Figure 2B:
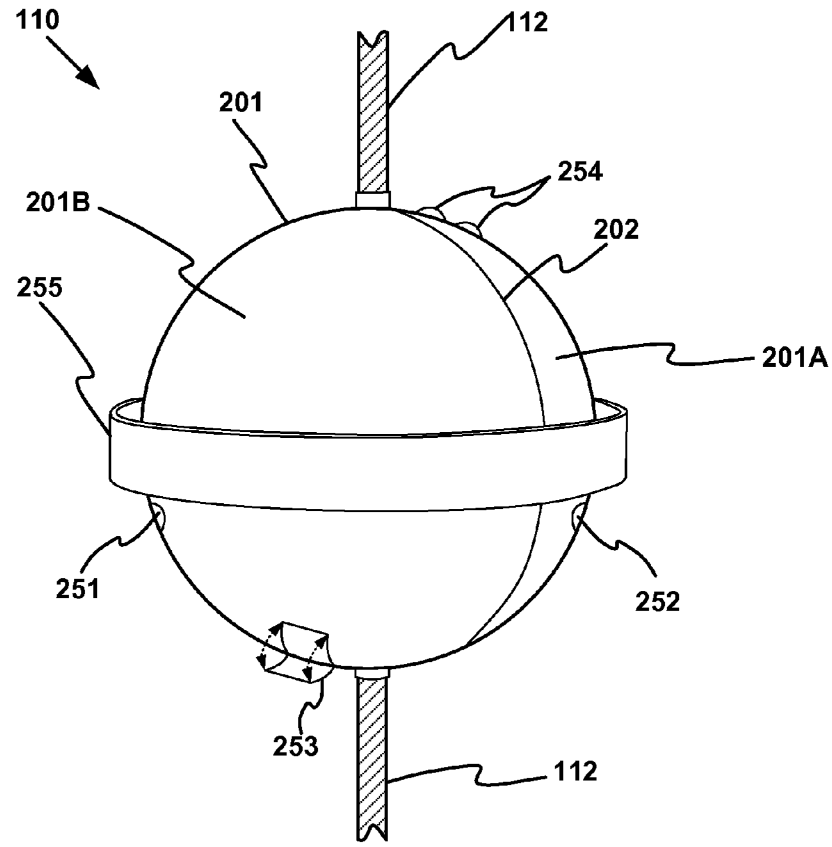
FIG. 2B illustrates a selection of features of a lifting device sensor unit, in accordance with various embodiments

FIG. 2B illustrates a selection of features of a lifting device sensor unit 110, in accordance with various embodiments. The features illustrated in FIG. 2B are located on or are accessible via the external surface of housing 201. This selection of features includes: a sound emitting device 251 (e.g., a speaker, siren, horn, or the like); a light emitting device 252 (e.g., a light bulb, strobe, light emitting diode, or the like); an access hatch 253; recharge contacts 254; and/or a protective bumper 255. Some, all, or none of these features may be included in embodiments of sensor unit 110. In one embodiment, light emitting device 252 comprises an array of status indicator lights such as Light Emitting Diodes (LEDs) which can be used to convey status information to an operator of lifting device 120.

In one embodiment, access hatch 253 provides easy access to components that are located in an internal portion of sensor unit 110. In some embodiments, access hatch 253 is a power source access hatch that facilitates access to power source(s) 217, to facilitate recharge, removal, and/or replacement of power source(s) 217 while sensor unit 110 remains coupled with load line 112. This allows some routine maintenance or internal access without requiring removal of sensor unit 110 from load line 112 or decoupling of housing portions 201A and 201B from one another.

Recharge contacts 254 facilitate recharge of power source(s) 217 without requiring removal of sensor unit 110 from load line 112 or decoupling of housing portions 201A and 201B from one another. For example, a person may attach charging leads to recharge contacts 254, or charging leads may automatically engage with recharge contacts 254 when sensor unit 110 is placed in a docked state. With reference to lifting device 120, in one embodiment, a docked state may be achieved by raising sensor unit 110 until it makes encounters a stop at lifting arm 119 where a dock or charging leads may reside. In other embodiments, when used with different types of lifting devices, a docked state may not be achievable or may be achieved in a different manner.

Protective bumper 255 extends from a portion of the external surface of housing 201 and provides a limited amount of impact protection for sensor unit 110. In some embodiments, protective bumper 255 may serve an additional purpose of securing or assisting in securing closure of portions (e.g., 201A, 201B) of housing 201. Protective bumper 255 may be slidably emplaced on housing 201 and held in place by friction and/or elastive force. Protective bumper 255 may also be latched or secured in place on housing 201.

Figure 2C:
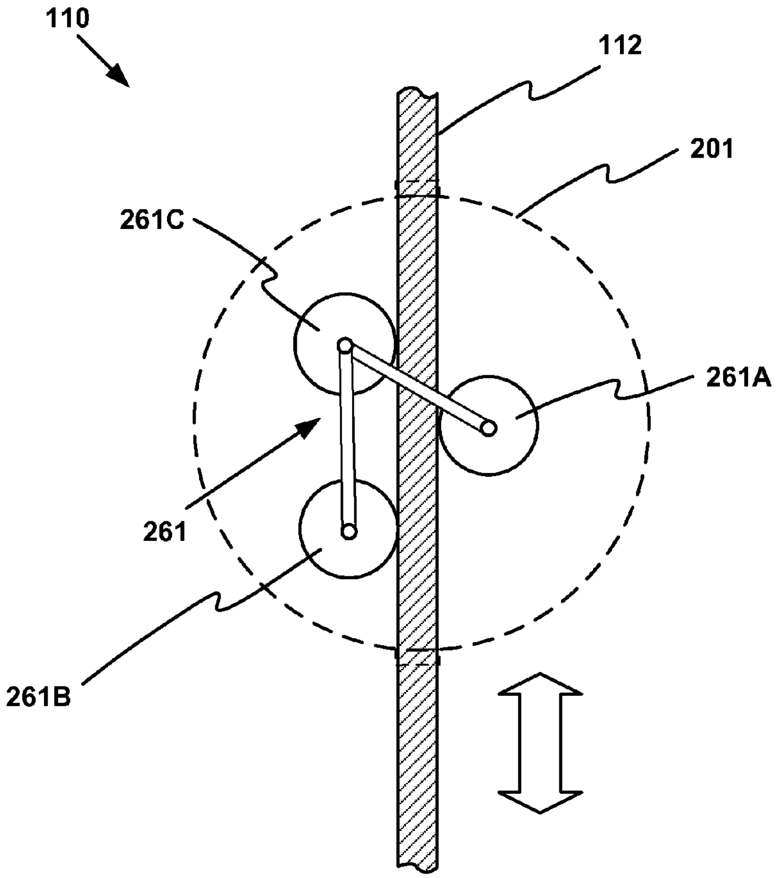
FIG. 2C illustrates an example load line positioner coupled with a housing of a sensor unit, in accordance with an embodiment.
Figure 2D:
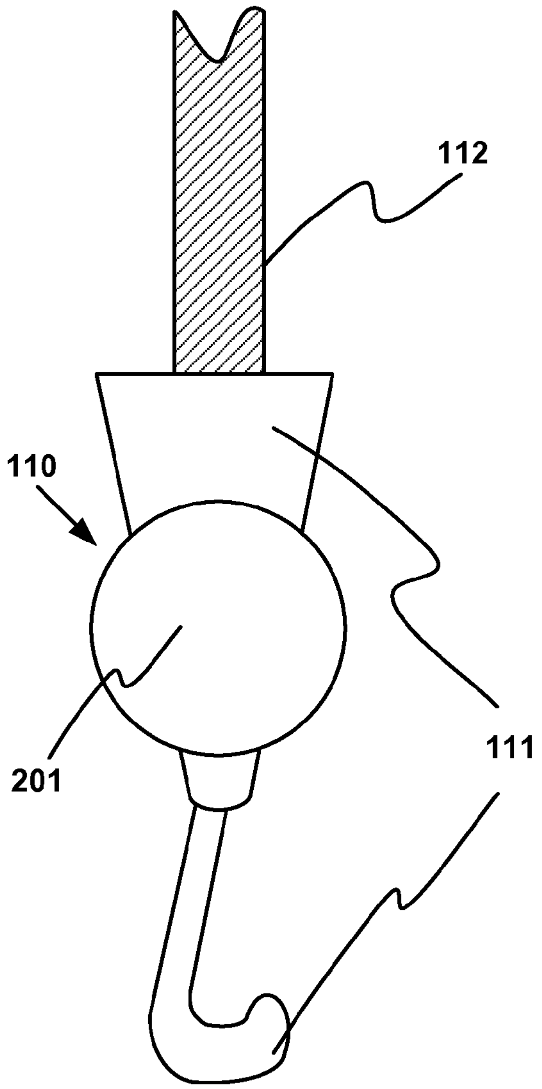
FIG. 2D illustrates an example sensor unit coupled with a hook block, in accordance with various embodiments.

FIG. 2C illustrates an example load line positioner 261 coupled with a housing 201 of sensor unit 110, in accordance with an embodiment. In one embodiment, load line positioner 261 comprises an arrangement of a plurality of pinch rollers/motors 261A, 261B, 261C to both hold sensor unit 110 in a particular place on load line 112 and to facilitate controllable and adjustable movement and positioning of sensor unit 110 along load line 112 (as indicated by the bi-directional arrow). Such movement, in one embodiment is controlled by position control 320 (FIG. 3) and may occur automatically in accordance with predefined criteria or in accordance with an input wirelessly received by sensor unit 110 (such as from a display unit 113 in response to a user input).

Movement of sensor unit 110 along load line 112 allows load monitor(s) 114 to monitor load 104 and take measurements from different locations. This can assist in photogrammetry and in other techniques used for determining range and/or position of objects in field of view(s) 218. Moreover, in performance of some lifts, it may be advantageous to move the sensor unit 110 in order for it to maintain reception of GNSS signals that would otherwise be shielded or blocked by objects in the lift area. Additionally, loads of large size may require the sensor unit 110 to be moved upward so that larger field(s) of view 218 around load 104 can be achieved than would be possible with sensor unit 110 in closer proximity to load 104. For example, it may be easy to get a field of view on sides of an I-beam with the sensor unit 110 located near the I-beam, but difficult to get a field on sides of a large panel, pallet, or container that block portions of the field of view from the same position of sensor unit 110. Additional movement of sensor unit 110 may occur in situations where the lifting device 120 uses a pulley type arrangement for securing hook 111 to load line 112 (as illustrated in FIG. 1B).

FIG. 2D illustrates an example sensor unit 110 coupled with a hook block 111, in accordance with various embodiments. As in FIGS. 2A and 2D, sensor unit 110 includes a housing 201 with which or within which, the various components and sensors of sensor unit 110 may be coupled. It is appreciated that one or more of the various features described in conjunction with FIG. 2A and FIG. 2B may be included in the sensor unit and housing thereof which are depicted in FIG. 2D. Although depicted as spherical, housing 201 of FIG. 2D, may be of other shapes. Additionally, although depicted as being disposed in the midst of load hook 111, sensor unit 110 and its housing 201 may be disposed between load line 112 and hook 111, in some embodiments or fully integrated within hook 111. The combination of hook 111 and sensor 110, as depicted in FIG. 2D, is one example of a hook block sensor assembly (e.g., hook block sensor assembly 1101, which is described in conjunction with FIG. 11). Though not illustrated in FIG. 2D, in some embodiments, hook 111 may be integrated with one or more pulleys such that cable 112 may be coupled with two or more points of a lifting arm 119 (see e.g., FIG. 1B, for one such example).

Figure 3:
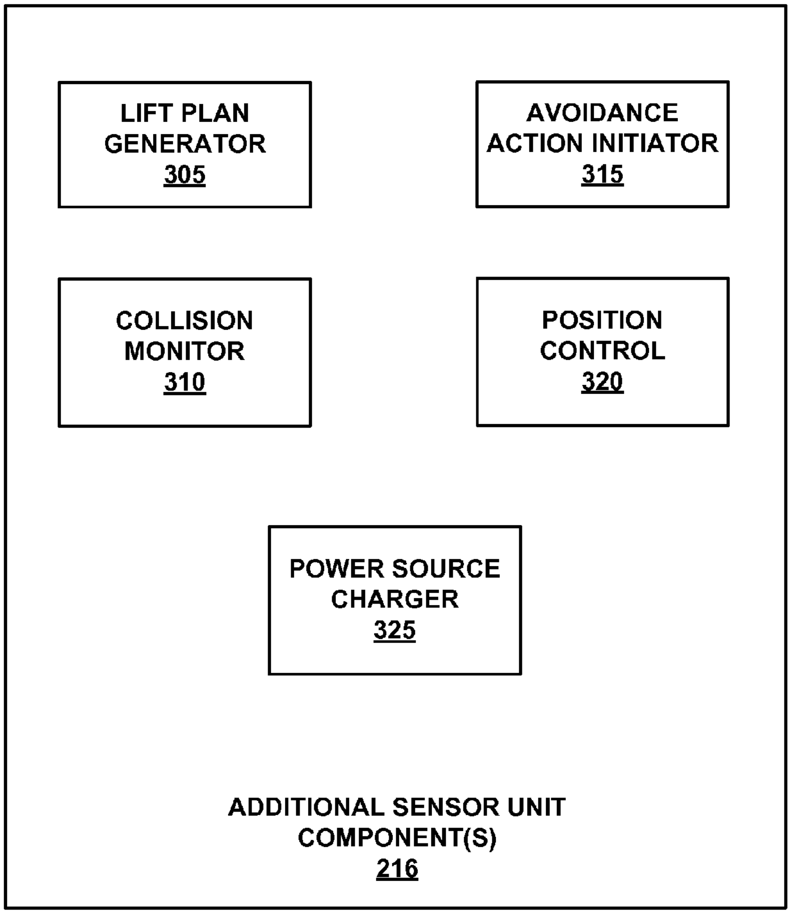
FIG. 3 is a block diagram of additional lifting device sensor unit components that may variously be included in a lifting device sensor unit, according to one or more embodiments.

FIG. 3 is a block diagram of additional lifting device sensor unit components 216 that may be variously included in a lifting device sensor unit 110, according to one or more embodiments. These additional sensor unit components may include one or more of a lift plan generator 305, a collision monitor 310, an avoidance action initiator 315, a position control 320, and a power source charger 325.

Lift plan generator 305 generates a lift plan for efficiently lifting and/or safely lifting a load 104 to a destination associated with said load. Following such a lift plan, rather than having an operator "eyeball" a lift from scratch with no lift plan can reduce accidents and in many cases speed lifting, thus improving productivity. In one embodiment, lift plan generator 305 utilizes identified information regarding a load to ascertain where its destination is on a job site. Other information such as a destination orientation of a load 104 may be ascertained. Such information can be discerned based on one or more object identifiers 102 that may be coupled with a load 104 and may include this information, such as in an RFID memory or may provide a identifier associated with the load which can be used for looking up or accessing such load destination information from a job site schematic or virtual plan. Lift plan generator 305 may additionally or alternatively take into account known (e.g., mapped such as in a virtual site plan or previously recognized by sensor unit 110) objects and hazards which are in the vicinity of the lift, such that these hazards are safely avoided in the generated lift plan. In this fashion, based on the virtual plan of a site and/or objects that load monitor 214 has mapped, the lift plan is generated such that an efficient path is outlined which does allows the load to avoid known hazards between the start and destination of the lift. In one embodiment wireless transceiver 215 provides this lift plan to a display unit 113 for display to a user during the lift. Lift plan generator 305 can also be used when multiple lifting devices 120 are used to lift and/or move a single shared load. In one embodiment, a separate lift plan generator 305 is implemented on each of the lifting devices 120 that are coordinating their efforts to lift and/or move a single shared load and generates commands to control the operation of its respective lifting device 120 such that the single shared load can be lifted and/or moved safely and efficiently. In one embodiment, communication between sensor unit 110 can be sent to multiple display units 113A and 113B to coordinate implementation of lifting and/or moving of a single shared load, or communication between multiple sensor units 110 can be sent to a single display unit 113A or 113B to coordinate implementation of lifting and/or moving of a single shared load. Similarly, communication between multiple sensor units 110 can be sent to multiple display units 113A and 113B to coordinate implementation of lifting and/or moving of a single shared load.

Figure 4:
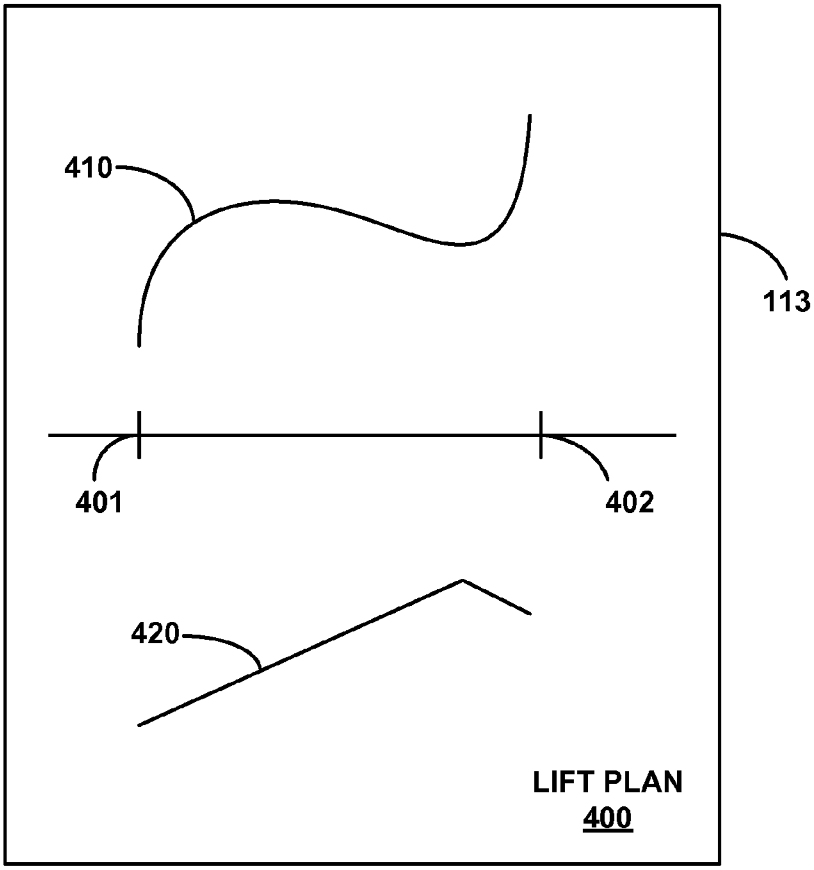
FIG. 4 illustrates a display of an example lift plan that has been generated by a lifting device sensor unit, according to an embodiment.

FIG. 4 illustrates a display of an example lift plan 400 that has been generated by a lifting device sensor unit 110, according to an embodiment. Lift plan 400 includes a top plan view 410 and a side elevation view 420 of the lift path of load 104 from an initial location 401 to a destination location 402. It is appreciated that, in some embodiments, additional or different views of the lift path of a load may be generated by lift plan generator 305. It is also appreciated that, in some embodiments, all or a portion of lift plan 400 may be displayed in conjunction with an image or virtual image of the environment through which a load will be lifted.

Referring again to FIG. 3, collision monitor 310 monitors for collision related hazards in a vicinity of a lifting device to which sensor unit 110 is coupled. In one embodiment, this collision monitoring function relies on position information from one or more other sensor units coupled that are coupled with other lifting devices. In one embodiment, collision monitor generates a geofence (a virtual barrier based upon positional coordinates) that surrounds the lifting device to which it is coupled. This geofence can be generated in several ways. One embodiment comprises establishing a circular geofences at a preset radius from a position of point 133 of sensor unit 110. This radius may be set when sensor unit 110 is initially coupled with a load line 112. Another embodiment comprises using a position (e.g., the position of point 133) that is associated with a position of sensor unit 110 as a radius for drawing a circular geofence around a position (e.g., the position of point 143) on the body of lifting device 120. In either case, the geofence may be re-generated by collision monitor 310 at regular intervals or as positions used in the calculation of the geofence changes.

Collision monitor 310 stores the generated geofence for lifting device 120 and then generates or utilizes similar geofences for other lifting devices in the area to which other sensor units 110 are coupled. Collision monitor 310 then monitors the geofences for occurrence of collision related hazard such as intersection of the geofences or encroachment of the position of a sensor unit or body of one lifting device across the border of a geofence associated with a different lifting device. In one embodiment, wireless transceiver 215 provides geofence information generated or stored in collision monitor 310 to a display unit 113.

Figure 5:
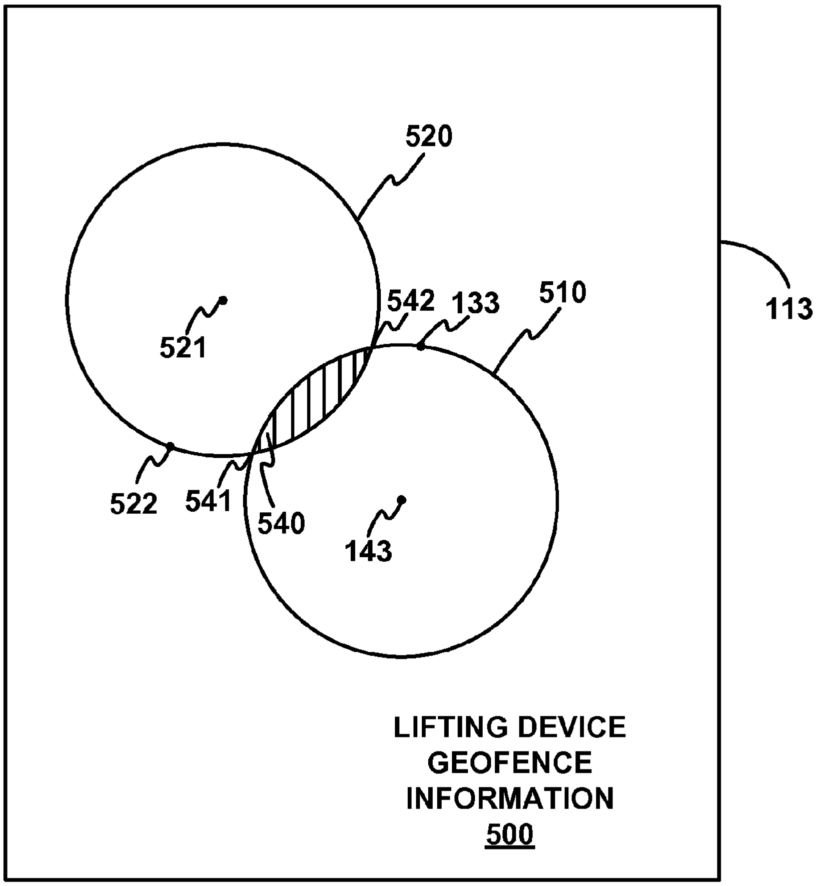
FIG. 5 illustrates a display of example lifting device geofence information that has been generated by one or more lifting device sensor units, according to an embodiment.

FIG. 5 illustrates a display of example lifting device geofence information 500 that has been generated by one or more lifting device sensor units 110, according to an embodiment. A geofence 510 is illustrated for lifting device 120. A second geofence 520 is illustrated for a second lifting device. Collision monitor 310 has generated geofence 510 as a circle about the position of point 143, with a radius established by the position of point 133 (see FIG. 1A). Geofence 520 has been generated in a similar manner as a circle about the position of point 521 (located on the body of a second lifting device), with a radius established by the position of point 522 (located on a sensor unit coupled with the load line of the second lifting device). This technique for generating geofences is acceptable for certain lifting devices such as boom cranes, when a sensor unit will be located substantially on a gravity vector beneath a boom tip. Other techniques, to include the use of buffer zones can utilized in other situations.

In one embodiment, collision monitor 310 monitors for a collision hazard such as an intersection 540 of geofences 510 and 520 or an incursion or anticipated incursion (based on direction and speed) of a known position, such as the position of point 133 with a point 541, 542 on the circumference of geofence 520 or the similar incursion of the position of point 522 with a point 541, 542 on the circumference of geofence 510. In one embodiment, when a collision hazard has been monitored by collision monitor 310, information regarding the occurrence of the collision hazard is provided to avoidance action initiator 315.

An avoidance action initiator 315 initiates at least one hazard avoidance action in response to a monitored occurrence of a collision related hazard. In various embodiments, among other actions, this can comprise initiating one or more actions such as causing a warning to sound from sound emitting device 251, causing illumination of an indicator of light emitting device 252, and/or causing a collision warning to be transmitted to a display unit 113. It is appreciated that avoidance action initiator 315 may initiate one or more similar actions in response to a monitored occurrence of a load hazard condition being indicated by load monitor 314. In various embodiments, among other actions, this can comprise one or more of causing a warning to sound from sound emitting device 251, causing illumination of an indicator of light emitting device 252, and/or causing a load hazard warning to be transmitted to a display unit 113. In one embodiment, avoidance action initiator 315 may generate commands which automatically initiate suspension of movement of load 104 to prevent a collision with another object. When it is determined that load 104 can again be moved safely, a safety code can be entered (e.g., using display unit 113A or 113B).

Position control 320 generates positioning commands, such as motor control signals for controlling the operation of load line positioner 261 or components thereof.

Power source charger 325 generating a charge for charging power source(s) 217. In various embodiments power source charger 325 comprises one or more of a solar panel and/or a motion induced power generator (operating in a similar fashion to the rotor of a self-winding watch). It is appreciated that even a small amount of power generated by power source charger 325 will extend the operational duration of power source(s) 217 and thus reduce down time of sensor unit 110.

In some embodiments, sensor unit(s) 110 and/or other portions of sensor system 100 act as reporting sources, which report information to an asset management system. Such an asset management system may be centralized or decentralized and may be located on or off of a construction site at which one or more reporting sources are located. The reporting sources report information regarding construction equipment assets to which they are coupled. Such information may include position information, operational information, and/or time of operation information. Such an asset management system may comprise a computer system (e.g., computer system 1000) such as a server computer and/or a database which are used for generating reports, warnings, and the like to be based upon reported information which may include one or more of (but is not limited to) location of operation of a construction equipment asset, time of day of operation of a construction equipment asset, interaction of a construction equipment asset with respect to one or more another construction equipment assets, interaction of a construction equipment asset with respect to a geofence, and/or compliance or non-compliance with a rule or condition of use associated with a construction equipment asset. Typically such a computer system and/or database will be located remotely from a sensor unit 110 and a sensor system 100.

In some embodiments, sensor unit(s) 110 and/or other portions of sensor system 100 act as reporting sources for reporting information to a lifting device load monitoring system, lifting device collision avoidance system, lifting device load hazard avoidance system, and/or a virtual reality system. Such a load monitoring system, collision avoidance system, load hazard avoidance system, and/or a virtual reality system may be centralized or decentralized and may be located on or off of a construction site at which one or more reporting sources are located. Such a load monitoring system, collision avoidance system, load hazard avoidance system, and/or a virtual reality system may comprise or be implemented with a computer system (e.g., computer system 1000) or some variation thereof. Typically, such a computer system will be located remotely from a sensor unit 110 and a sensor system 100. In some embodiments, one or more of object identification, lift plan generation, collision avoidance monitoring, load hazard monitoring, geofence generation, avoidance action initiation, and/or other functions described above with respect to sensor system 100 and/or sensor unit 110 may be handled by a collision avoidance and/or virtual reality system. Such functions may be implemented based in whole or in part on information reported by one or more sensor systems 100 or sensor units 110.

Example Methods of Use

Figure 6:
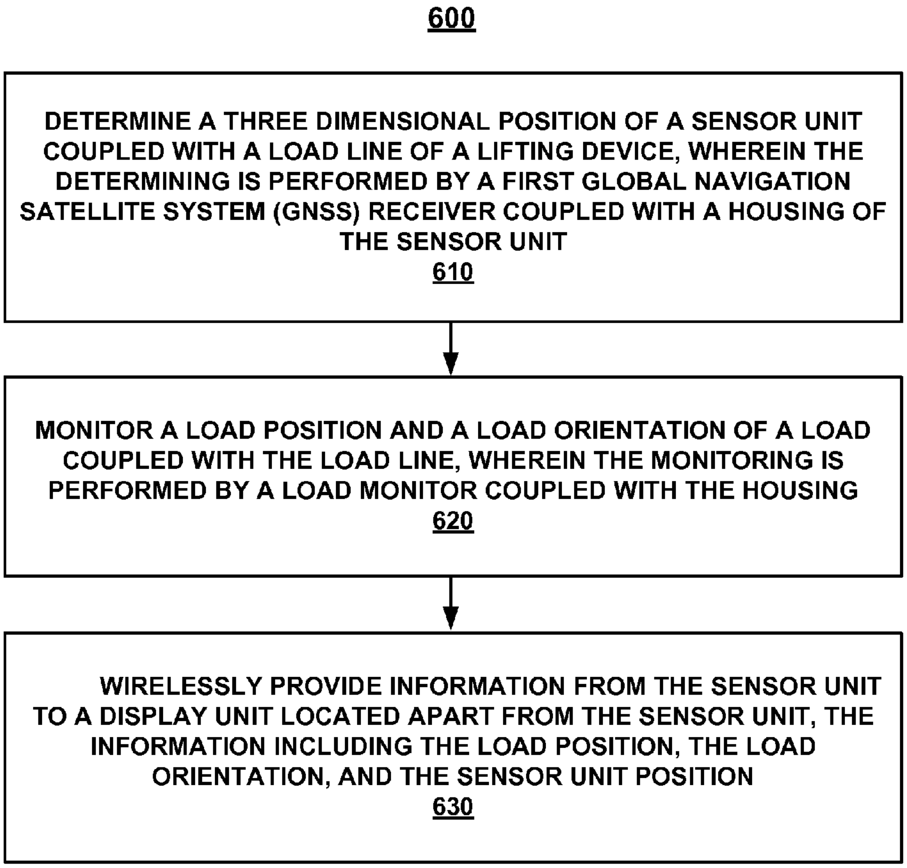
FIG. 6 is a flow diagram of an example method of monitoring a lifting device load, in accordance with an embodiment.
Figure 7:
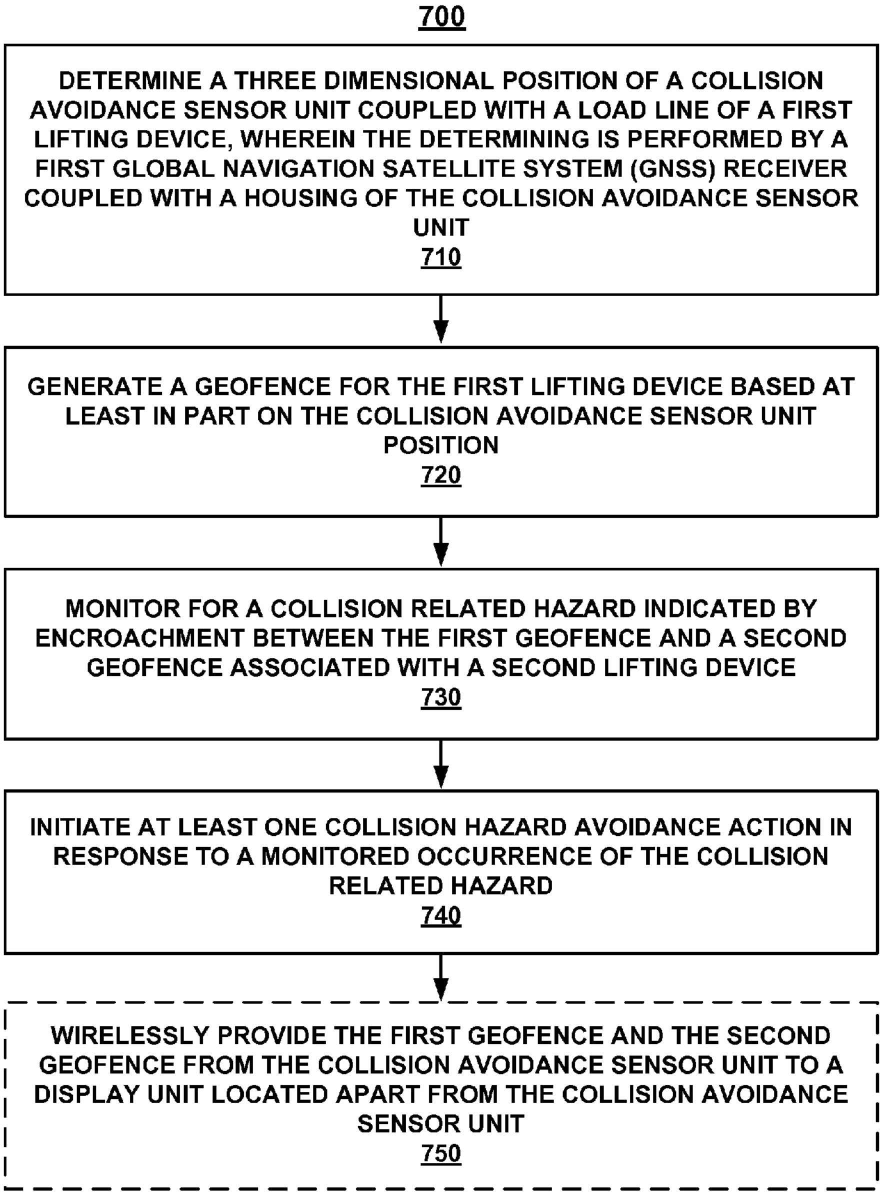
FIG. 7 is a flow diagram of an example method of lifting device collision, in accordance with an embodiment.
Figure 8:
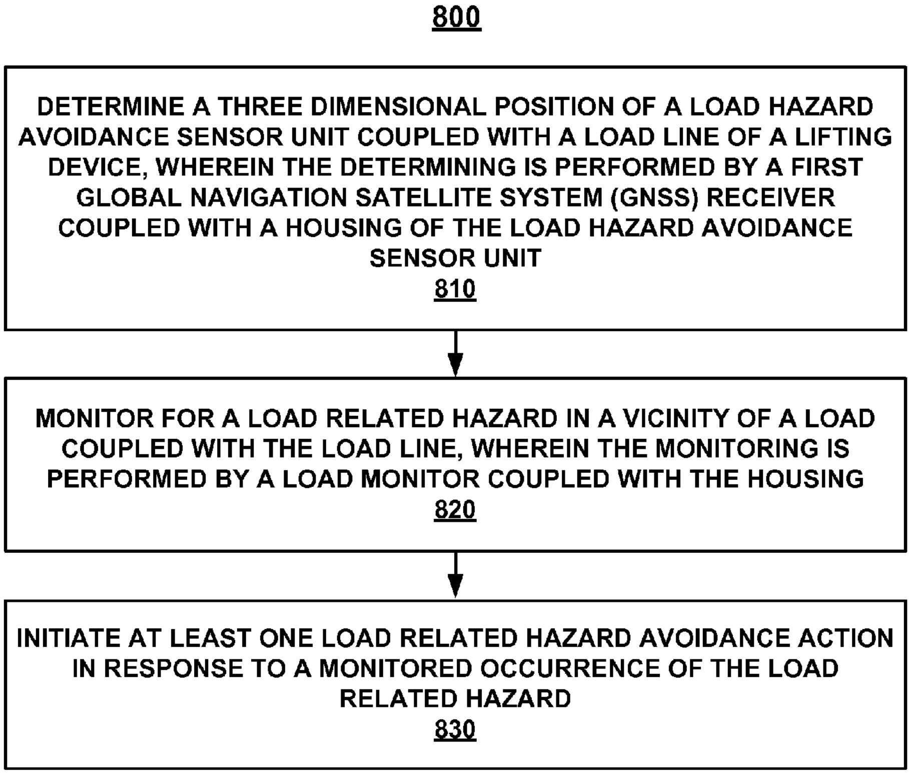
FIG. 8 is a flow diagram of an example method of lifting device load hazard avoidance, in accordance with an embodiment.

With reference to FIGS. 6, 7, and 8, flow diagrams 600, 700, and 800 illustrate example procedures used by various embodiments. Flow diagrams 600, 700, and 800 include processes and operations that, in various embodiments, are carried out by one or more processors (e.g., processor(s) 1006 of FIG. 10) under the control of computer-readable and computer-executable instructions. The computer-readable and computer-executable instructions reside, for example, in tangible data storage features such as volatile memory, non-volatile memory, and/or a data storage unit (see e.g., 1008, 1010, and 1012 of FIG. 10). The computer-readable and computer-executable instructions can also reside on any tangible computer readable media such as a hard disk drive, floppy disk, magnetic tape, Compact Disc, Digital Versatile Disc, and the like. The computer-readable and computer-executable instructions, which may reside on computer readable media, are used to control or operate in conjunction with, for example, one or more components of sensor unit 110 and/or and or one or more processors 1006.

Although specific procedures are disclosed in flow diagrams 600, 700, and 800 such procedures are examples. That is, embodiments are well suited to performing various other operations or variations of the operations recited in the processes of flow diagrams 600, 700, and 800. Likewise, in some embodiments, the operations in flow diagrams 600, 700, and 800 may be performed in an order different than presented, not all of the operations described in one or more of these flow diagrams may be performed, and/or one or more additional operation may be added.

Example Method of Monitoring a Lifting Device Load

FIG. 6 is a flow diagram 600 of an example method of monitoring a lifting device load, in accordance with an embodiment. Reference will be made to FIGS. 1A and 2A to facilitate the explanation of the operations of the method of flow diagram 600. In one embodiment, the method of flow diagram 600 describes a use of sensor unit 110 and/or sensor system 100, while coupled with a lifting device, such as lifting device 120.

At operation 610, in one embodiment, a three dimensional position is determined for a point of a sensor unit 110 that is coupled with a load line 112 of a lifting device 120. This position determining is performed by at least a first GNSS receiver 213 that is coupled with a housing 201 of sensor unit 110. For example, this can comprise GNSS receiver 213A determining a three dimensional position of point 133 of sensor unit 110. This can further comprise GNSS receiver 213A (assuming it is a dual axis GNSS receiver with multiple antennas) or GNSS receiver 213B further determining an angular orientation of sensor unit 110.

At operation 620, in one embodiment, load position and a load orientation of a load 104 are monitored. The monitored load 104 is coupled with the load line 112 of the lifting device 120. In one embodiment, this monitoring of the load is performed by load monitor 214 in the manner that has previously been described herein.

At operation 630, in one embodiment, information is wirelessly provided from the sensor unit to a display unit located apart from the sensor unit. The information includes one or more of the load position, the load orientation, and the sensor unit position. The information may also include position, ranging, laser scanner information, bar code information, RFID information, load related hazard information, or image information related to objects monitored in the field of view of load monitor(s) 214. Wireless transceiver 215 transmits or provides access of this information. This can comprise wirelessly providing the information for display on a hand-holdable unit (e.g., on display unit 113B) for display in an operator cab of said lifting device (e.g., on display unit 113A) or for transmission to another sensor unit 110 or other device or system.

Example Method of Lifting Device Collision Avoidance

FIG. 7 is a flow diagram 700 of an example method of lifting device collision avoidance, in accordance with an embodiment. Reference will be made to FIGS. 1A, 2A, 3, and 5 to facilitate the explanation of the operations of the method of flow diagram 700. In one embodiment, the method of flow diagram 700 describes a use of sensor unit 110 (referred to as a lifting device collision avoidance unit) and/or sensor system 100, while coupled with a lifting device, such as lifting device 120.

At operation 710, in one embodiment, a three dimensional position is determined for a point of a collision avoidance sensor unit 110 that is coupled with a load line 112 of a lifting device 120. This position determining is performed by at least a first GNSS receiver 213 that is coupled with a housing 201 of collision avoidance sensor unit 110. For example, this can comprise GNSS receiver 213A determining a three dimensional position of point 133 of collision avoidance sensor unit 110. This can further comprise GNSS receiver 213A (assuming it is a dual axis GNSS receiver with multiple antennas) or GNSS receiver 213B further determining an angular orientation of collision avoidance sensor unit 110.

At operation 720, in one embodiment, a geofence is generated for the first lifting device 120. The geofence is generated based at least in part on the collision avoidance sensor unit position that has been determined. In one embodiment, the geofence is generated by collision monitor 310 in the manner that has been previously described herein.

At operation 730, in one embodiment, a collision related hazard is monitored for occurrence. Occurrence of a collision related hazard is indicated by encroachment between the first geofence and a second geofence that is associated with a second lifting device. In one embodiment, collision monitor 310 monitors for occurrence of a collision related hazard in the manner previously described herein. The second geofence may be generated by collision monitor 310 based on position information accessed from a second collision avoidance sensor unit that is coupled with the second lifting device, or the second geofence may be received from the second collision avoidance sensor unit.

At operation 740, in one embodiment, at least one collision hazard avoidance action is initiated in response to a monitored occurrence of a collision related hazard. In one embodiment, this comprises avoidance action initiator 315 initiating an avoidance action in response to collision monitor 310 monitoring an occurrence of collision related hazard. As previously described this can comprise avoidance action initiator 315 causing wireless transceiver 215 to wirelessly provide a collision alert for display on a display unit 113 that is located apart from collision avoidance sensor unit 110; causing a warning such as a siren, tone, or horn to sound; and/or or causing an indicator such as a light or strobe to illuminate.

At operation 750, in one embodiment, method of flow diagram 700 additionally comprises wirelessly providing the first geofence and the second geofence from the collision avoidance sensor unit 110 to a display unit 113 located apart from the collision avoidance sensor unit 110. FIG. 5 shows an example of such information displayed on display unit 113. It is appreciated that more that two geofences may be provided for display in other embodiments. It is also appreciated that the geofences may be displayed in conjunction with images or virtual images of the working area in and surrounding the geofences.

Example Method of Lifting Device Load Hazard Avoidance

FIG. 8 is a flow diagram 800 of an example method of lifting device load hazard avoidance, in accordance with an embodiment. Reference will be made to FIGS. 1A, 2A, and 3 to facilitate the explanation of the operations of the method of flow diagram 800. In one embodiment, the method of flow diagram 800 describes a use of sensor unit 110 (referred to as a lifting device load hazard avoidance unit) and/or sensor system 100, while coupled with a lifting device, such as lifting device 120.

At operation 810, in one embodiment, a three dimensional position is determined for a point of a load hazard avoidance sensor unit 110 that is coupled with a load line 112 of a lifting device 120. This position determining is performed by at least a first GNSS receiver 213 that is coupled with a housing 201 of load hazard avoidance sensor unit 110. For example, this can comprise GNSS receiver 213A determining a three dimensional position of point 133 of load hazard avoidance sensor unit 110. This can further comprise GNSS receiver 213A (assuming it is a dual axis GNSS receiver with multiple antennas) or GNSS receiver 213B further determining an angular orientation of load hazard avoidance sensor unit 110.

At operation 820, in one embodiment, a load related hazard in a vicinity of a load 104 is monitored for. The load 104 is coupled with load line 112 of lifting device 120. In one embodiment, the monitoring performed by load monitor(s) 214 in one or more of the manners previously described herein. This includes monitoring for an imminent or potential collision between load 104 and an object in the vicinity of load 104. This also includes monitoring for loss of visibility of a person 117 beneath load 104.

At operation 830, in one embodiment, at least one load related hazard avoidance action is initiated in response to a monitored occurrence of a load related hazard. In one embodiment, this comprises avoidance action initiator 315 initiating an avoidance action in response to load monitor(s) 114 monitoring an occurrence of load related hazard. As previously described this can comprise avoidance action initiator 315 causing wireless transceiver 215 to wirelessly provide a load hazard alert for display on a display unit 113 that is located apart from collision avoidance sensor unit 110; causing a warning such as a siren, tone, or horn to sound; and/or or causing an indicator such as a light or strobe to illuminate.

Example GNSS Receiver

Figure 9:
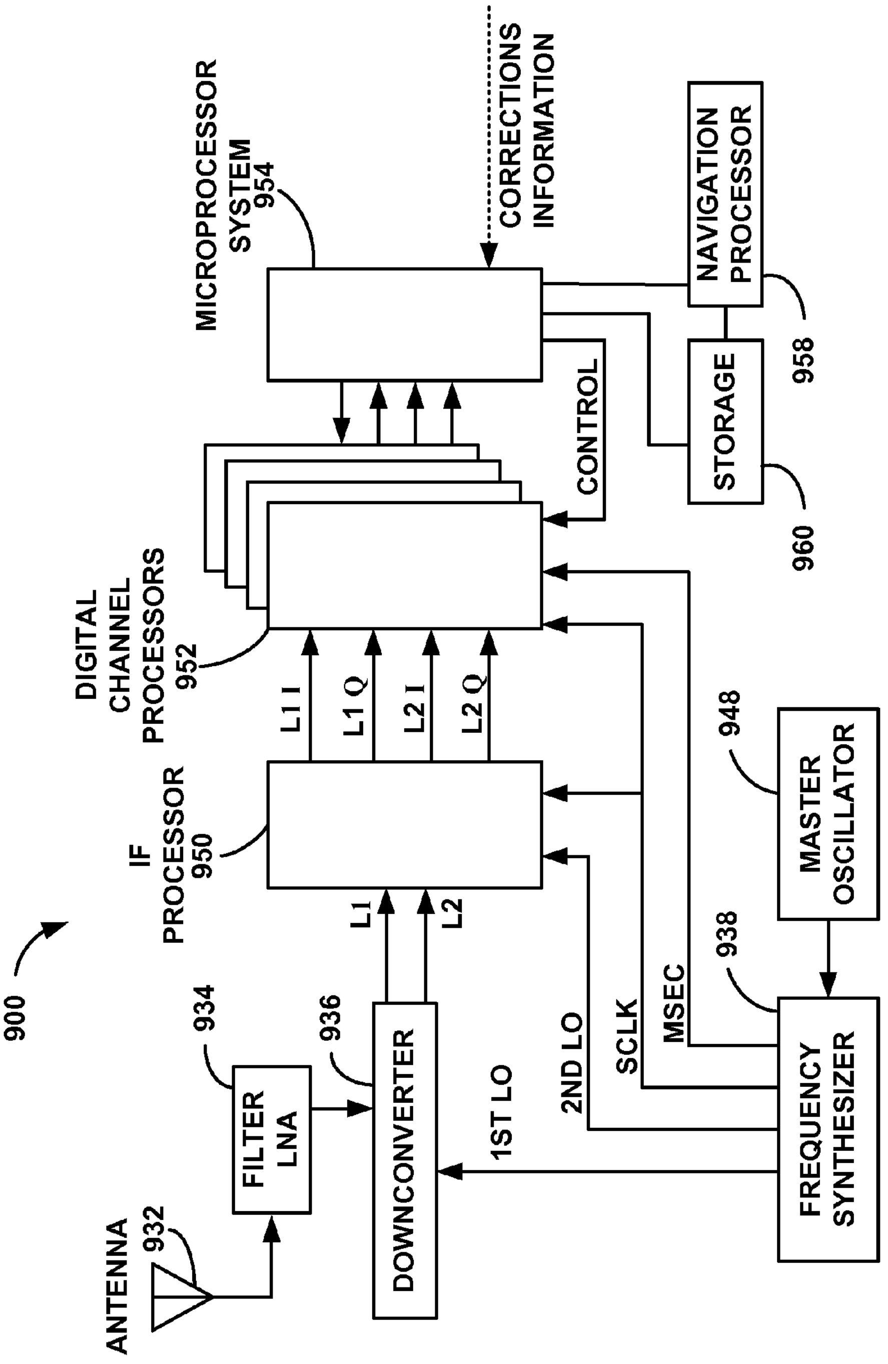
FIG. 9 shows an example GNSS receiver that may be used in accordance with some embodiments.

FIG. 9, shows an example GNSS receiver 900, according to one embodiment which may be utilized all or in part one or more of GNSS receivers 213A, 213B, 107, and/or 108. It is appreciated that different types or variations of GNSS receivers may also be suitable for use in the embodiments described herein. In FIG. 9, received L1 and L2 signals are generated by at least one GPS satellite. Each GPS satellite generates different signal L1 and L2 signals and they are processed by different digital channel processors 952 which operate in the same way as one another. FIG. 9 shows GPS signals (L1=1575.42 MHz, L2=1227.60 MHz) entering GPS receiver 900 through a dual frequency antenna 932. Antenna 932 may be a magnetically mountable model commercially available from Trimble Navigation of Sunnyvale, Calif. Master oscillator 948 provides the reference oscillator which drives all other clocks in the system. Frequency synthesizer 938 takes the output of master oscillator 948 and generates important clock and local oscillator frequencies used throughout the system. For example, in one embodiment frequency synthesizer 938 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 934 performs filtering and low noise amplification of both L1 and L2 signals. The noise figure of GPS receiver 900 is dictated by the performance of the filter/LNA combination. The downconvertor 936 mixes both L1 and L2 signals in frequency down to approximately 175 MHz and outputs the analogue L1 and L2 signals into an IF (intermediate frequency) processor 950. IF processor 950 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 952 inputs the digitally sampled L1 and L2 inphase and quadrature signals. All digital channel processors 952 are typically are identical by design and typically operate on identical input samples. Each digital channel processor 952 is designed to digitally track the L1 and L2 signals produced by one satellite by tracking code and carrier signals and to from code and carrier phase measurements in conjunction with the microprocessor system 954. One digital channel processor 952 is capable of tracking one satellite in both L1 and L2 channels. Microprocessor system 954 is a general purpose computing device (such as computer system 1000 of FIG. 10) which facilitates tracking and measurements processes, providing pseudorange and carrier phase measurements for a navigation processor 958. In one embodiment, microprocessor system 954 provides signals to control the operation of one or more digital channel processors 952. Navigation processor 958 performs the higher level function of combining measurements in such a way as to produce position, velocity and time information for the differential and surveying functions. Storage 960 is coupled with navigation processor 958 and microprocessor system 954. It is appreciated that storage 960 may comprise a volatile or non-volatile storage such as a RAM or ROM, or some other computer readable memory device or media. In one rover receiver embodiment, navigation processor 958 performs one or more of the methods of position correction.

In some embodiments, microprocessor 954 and/or navigation processor 958 receive additional inputs for use in refining position information determined by GPS receiver 900. In some embodiments, for example, corrections information is received and utilized. Such corrections information can include differential GPS corrections, RTK corrections, and wide area augmentation system (WAAS) corrections.

Example Computer System Environment

Figure 10:
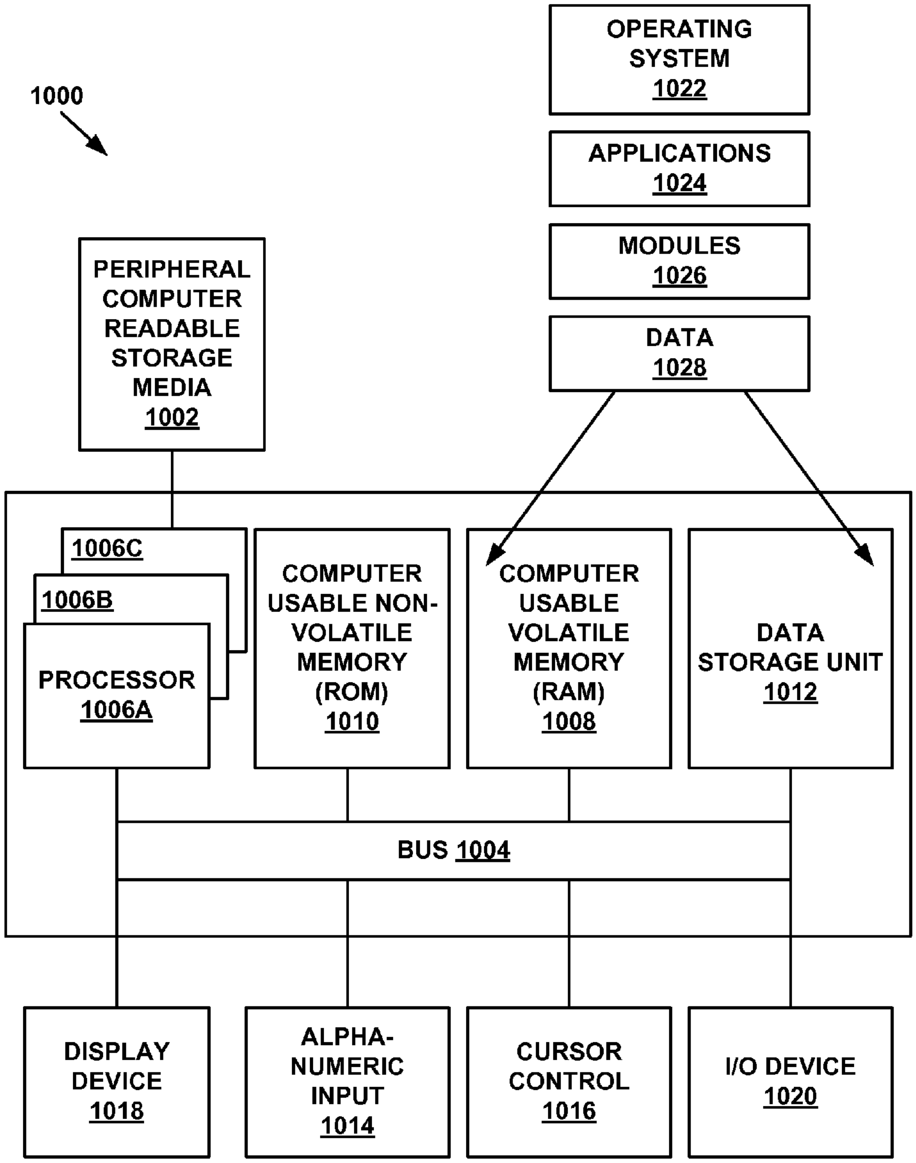
FIG. 10 illustrates a block diagram of an example computer system with which or upon which various embodiments of the present invention may be implemented.

With reference now to FIG. 10, all or portions of some embodiments described herein are composed of computer-readable and computer-executable instructions that reside, for example, in computer-usable/computer-readable storage media of a computer system. That is, FIG. 10 illustrates one example of a type of computer (computer system 1000) that can be used in accordance with or to implement various embodiments which are discussed herein. It is appreciated that computer system 1000 of FIG. 10 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 1000 of FIG. 10 is well adapted to having peripheral computer-readable storage media 1002 such as, for example, a floppy disk, a compact disc, digital versatile disc, universal serial bus "thumb" drive, removable memory card, and the like coupled thereto.

System 1000 of FIG. 10 includes an address/data bus 1004 for communicating information, and a processor 1006A coupled to bus 1004 for processing information and instructions. As depicted in FIG. 10, system 1000 is also well suited to a multi-processor environment in which a plurality of processors 1006A, 1006B, and 1006C are present. Conversely, system 1000 is also well suited to having a single processor such as, for example, processor 1006A. Processors 1006A, 1006B, and 1006C may be any of various types of microprocessors. System 1000 also includes data storage features such as a computer usable volatile memory 1008, e.g., random access memory (RAM), coupled to bus 1004 for storing information and instructions for processors 1006A, 1006B, and 1006C. System 1000 also includes computer usable non-volatile memory 1010, e.g., read only memory (ROM), coupled to bus 1004 for storing static information and instructions for processors 1006A, 1006B, and 1006C. Also present in system 1000 is a data storage unit 1012 (e.g., a magnetic or optical disk and disk drive) coupled to bus 1004 for storing information and instructions. System 1000 also includes an optional alphanumeric input device 1014 including alphanumeric and function keys coupled to bus 1004 for communicating information and command selections to processor 1006A or processors 1006A, 1006B, and 1006C. System 1000 also includes an optional cursor control device 1016 coupled to bus 1004 for communicating user input information and command selections to processor 1006A or processors 1006A, 1006B, and 1006C. In one embodiment, system 1000 also includes an optional display device 1018 coupled to bus 1004 for displaying information.

Referring still to FIG. 10, optional display device 1018 of FIG. 10 may be a liquid crystal device, cathode ray tube, plasma display device or other display device suitable for creating graphic images and alphanumeric characters recognizable to a user. Optional cursor control device 1016 allows the computer user to dynamically signal the movement of a visible symbol (cursor) on a display screen of display device 1018 and indicate user selections of selectable items displayed on display device 1018. Many implementations of cursor control device 1016 are known in the art including a trackball, mouse, touch pad, joystick or special keys on alphanumeric input device 1014 capable of signaling movement of a given direction or manner of displacement. Alternatively, it will be appreciated that a cursor can be directed and/or activated via input from alphanumeric input device 1014 using special keys and key sequence commands System 1000 is also well suited to having a cursor directed by other means such as, for example, voice commands. System 1000 also includes an I/O device 1020 for coupling system 1000 with external entities. For example, in one embodiment, I/O device 1020 is a modem for enabling wired or wireless communications between system 1000 and an external network such as, but not limited to, the Internet.

Referring still to FIG. 10, various other components are depicted for system 1000. Specifically, when present, an operating system 1022, applications 1024, modules 1026, and data 1028 are shown as typically residing in one or some combination of computer usable volatile memory 1008 (e.g., RAM), computer usable non-volatile memory 1010 (e.g., ROM), and data storage unit 1012. In some embodiments, all or portions of various embodiments described herein are stored, for example, as an application 1024 and/or module 1026 in memory locations within RAM 1008, computer-readable storage media within data storage unit 1012, peripheral computer-readable storage media 1002, and/or other tangible computer readable storage media.

Ad-Hoc Wireless Communication Network

Figure 11:
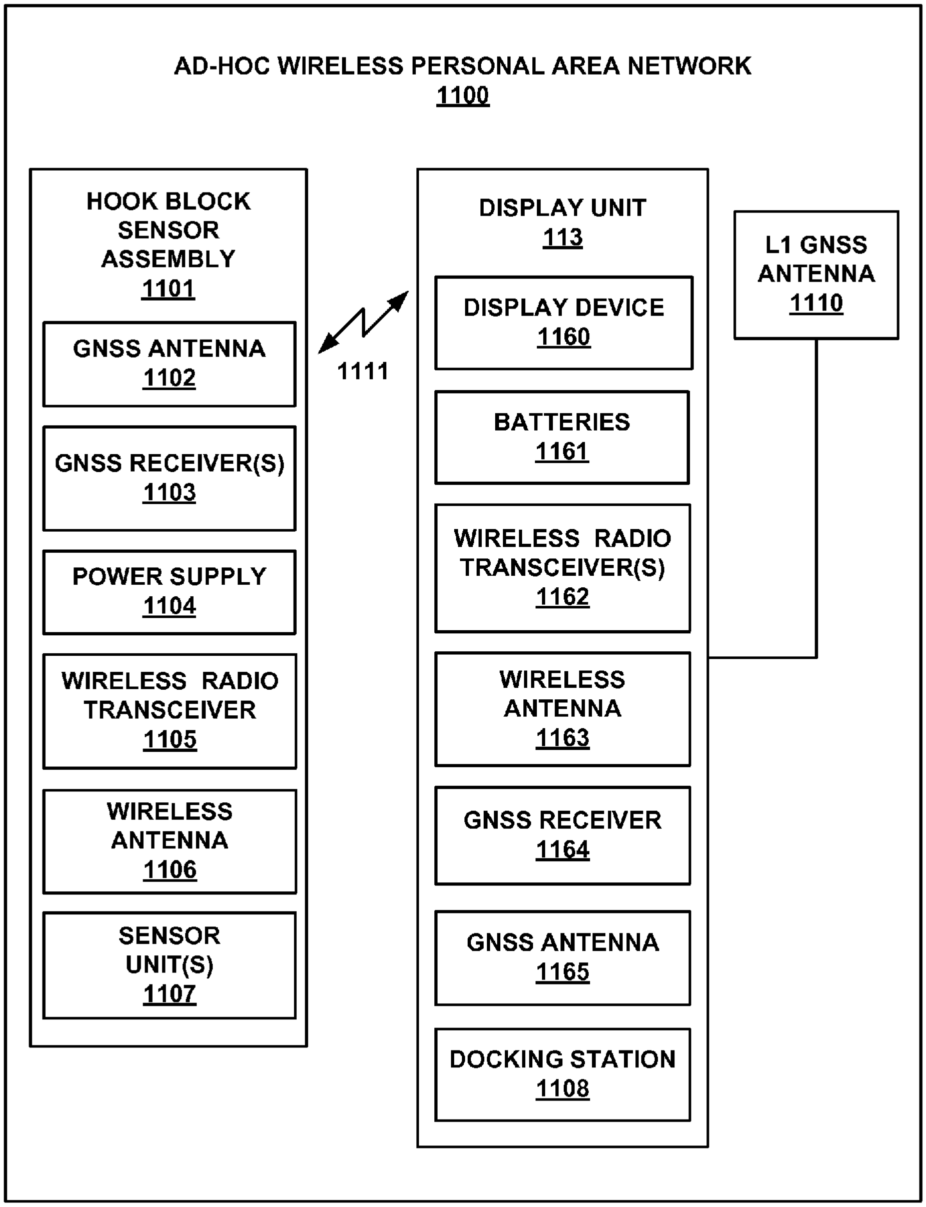
FIG. 11 is a block diagram of an example ad-hoc wireless personal area network in accordance with one or more embodiments.

FIG. 11 is a block diagram of an example ad-hoc wireless personal area network 1100 in accordance with one or more embodiments. In FIG. 11, a hook block sensor assembly 1101 is communicatively coupled with display unit 113 via wireless connection 1111. As described above, in one embodiment, sensor unit 110 may be built into or housed in lifting hook 111, or a similar load attachment point/mechanism, located on a distal end/portion of load line 112. For the purpose of brevity, a comprehensive illustration of components of sensor unit 110 which are implemented as hook block sensor assembly are not shown in FIGS. 11 and 12. However, it is understood that various features and components of sensor unit 110 as described above are combined in implementations of hook block sensor assembly 1101. In FIG. 11, hook block sensor assembly 1101 comprises a GNSS antenna 1102 and one or more GNSS receivers 1103. Hook block sensor assembly 1101 further comprises a power supply 1104 for supplying power to hook block sensor assembly 1101. It is noted that power supply 1104 can comprise batteries and/or a connection to vehicle supplied power.

A radio transceiver 1105 and wireless antenna 1106 provide wireless communication between hook block sensor assembly 1101 and display unit 113 as indicated by 1111. Hook block sensor assembly 1101 further comprises one or more sensor units 1107 which are implemented to accomplish load monitoring and/or as described above with reference to load monitors 214. Sensor units 1107 can further be used for lift plan implementation, position control, collision monitoring, and initiating avoidance actions as discussed above with reference to sensor unit components 216 of FIG. 2A. These components of hook block sensor assembly 1101 are communicatively and/or electrically coupled with one another as required for performing functions of load monitoring, collision avoidance, and/or load hazard avoidance as described above.

In accordance with various embodiments, the components of hook block sensor assembly 1101 are housed within a housing 201 (see e.g., FIG. 2D). In one embodiment, housing 201 is coupled with hook 111 (see e.g., FIG. 2D) and one or more of the components of hook block sensor assembly 1101 described above in FIGS. 2A, 2B, and 3 are coupled with housing 201. Alternatively, the components of hook block sensor assembly 1101 may be coupled with hook 111 and enclosed by housing 201. It is further noted that other components of sensor unit 110 (e.g., sound emitting device 251, light emitting device 252, access hatch 253, recharge contacts 254, and/or protective bumper 255) may be included in housing 201 in accordance with various embodiments.

As discussed above, display unit 113 may be a dedicated display with a wireless transceiver or may be part of an electronic device such as smart phone, netbook, notebook computer, tablet computer, or the like. In the embodiment of FIG. 11, display unit 113 is removeably coupled with a docking station 1108 which provides connection to a power source (not shown) and a communication connection with L1 GNSS antenna 1110. In accordance with various embodiments, display device 1160 may be a liquid crystal device, cathode ray tube, or a touch screen assembly configured to detect the touch or proximity of a user's finger, or other input device, at or near the surface of display device 1160 and to communicate such an event to a processor (e.g., processors 1006A, 1006B, and/or 1006C of FIG. 10). Display unit 113 further comprises batteries 1161 for providing power to display unit 113 when it is de-coupled from docking station 1108.

Display unit 113 further comprises one or more wireless radio transceivers 1162 and wireless antenna 1163 for wirelessly communicating with other components of ad-hoc wireless personal area network 1100. In the embodiment of FIG. 11, display unit 113 comprises a GNSS receiver 1164 and GNSS antenna 1165 configured for receiving satellite navigation signals and for determining the position of display unit 113. As shown in FIG. 11, display unit 113 is communicatively coupled with L1 GNSS antenna 1110 which is used to receive satellite navigation signals when display unit 113 is coupled with docking station 1108. This to improve the reception of satellite navigation signals which may be blocked or degraded when display unit 113 is located within cab 121. An example of a commercially available model of display unit 113 is the Yuma® computer from Trimble Navigation of Sunnyvale, Calif.

In accordance with various embodiments, one or more of wireless radio transceivers 1105 and 1162 may operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. Personal area networks refer to short-range, and often low-data-rate, wireless communications networks. In accordance with embodiments of the present technology, components of ad-hoc wireless personal area network 1100 are configured for automatic detection of other components and for automatically establishing wireless communications. In one embodiment, display unit 113 comprises a first wireless radio transceiver 1162 for communicating with other components of ad-hoc wireless personal area network 1100 and one or more wireless radio transceivers 1162 for wirelessly communicating outside of ad-hoc wireless personal area network 1100.

Figure 12:
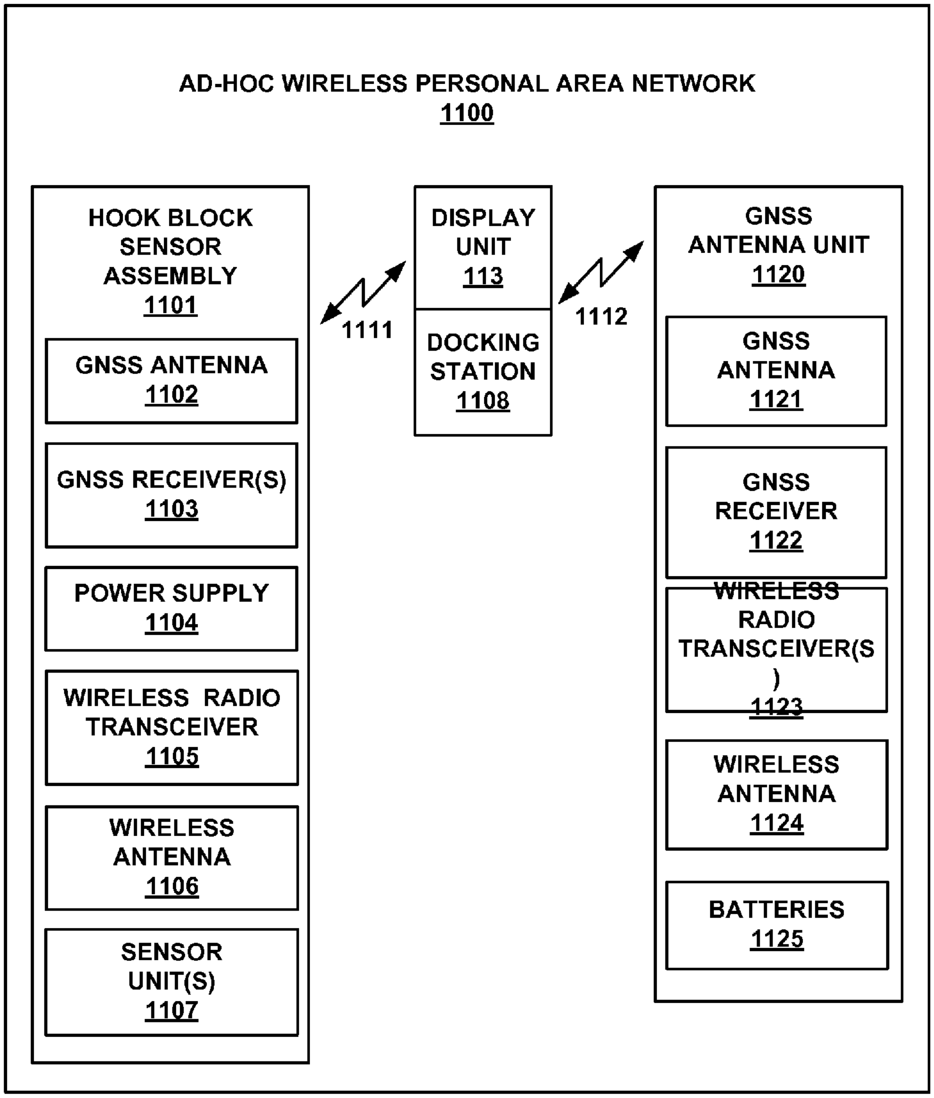
FIG. 12 is a block diagram of an example ad-hoc wireless personal area network in accordance with one or more embodiments.

FIG. 12 is a block diagram of an example ad-hoc wireless personal area network 1100 in accordance with one or more embodiments. In FIG. 12, ad-hoc wireless personal area network 1100 comprises hook block sensor assembly 1101 and display unit 113 as described above with reference to FIG. 11. In FIG. 12, ad-hoc wireless personal area network 1100 further comprises GNSS antenna unit 1120. In the embodiment of FIG. 12, GNSS antenna unit 1120 comprises a GNSS antenna 1121 and GNSS receiver 1122 for receiving satellite navigation signals and for determining the position of GNSS antenna unit 1120. GNSS antenna unit 1120 further comprises one or more wireless radio transceivers 1123 and wireless antenna 1124 for providing wireless communication with display unit 113 as indicated by 1112. In accordance with various embodiments, wireless radio transceiver 1123 may operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. An example of a commercially available model of GNSS antenna unit is the SPS 882 Smart GPS Antenna from Trimble Navigation of Sunnyvale, Calif. In one embodiment, GNSS antenna unit 1120 is mounted at the rear of lifting device 120 as shown by global navigation satellite receiver 108 of FIG. 1A.

In operation, hook block sensor assembly 1101, display unit 113, and GNSS antenna unit 1120 are configured to implement an ad-hoc wireless personal area network to assist in or accomplish one or more of efficient load delivery, load monitoring, collision avoidance, and load hazard avoidance as described above. In one embodiment, hook block sensor assembly 1101, display unit 113, and GNSS antenna unit 1120 are configured to initiate an automatic discovery process in which components of ad-hoc wireless personal area network 1100 detect each other by exchanging messages without the necessity of user initiation and/or intervention. Additionally, in one embodiment hook block sensor assembly 1101, display unit 113, and GNSS antenna unit 1120 are configured to automatically initiate processes to assist in or accomplish one or more of efficient load delivery, load monitoring, collision avoidance, and load hazard avoidance such as determining the position of hook block sensor assembly 1101, display unit 113, and/or load 104. Furthermore, in one embodiment display unit 113 is configured to send and receive data outside of ad-hoc wireless personal are network 1100. Thus, display unit can be used to receive updates, correction data for position determination, and other instructions for implementing a plan at a site. Additionally, display unit 113 can be used for storing, forwarding, and reporting data used in site monitoring or other purposes.

Figure 13:
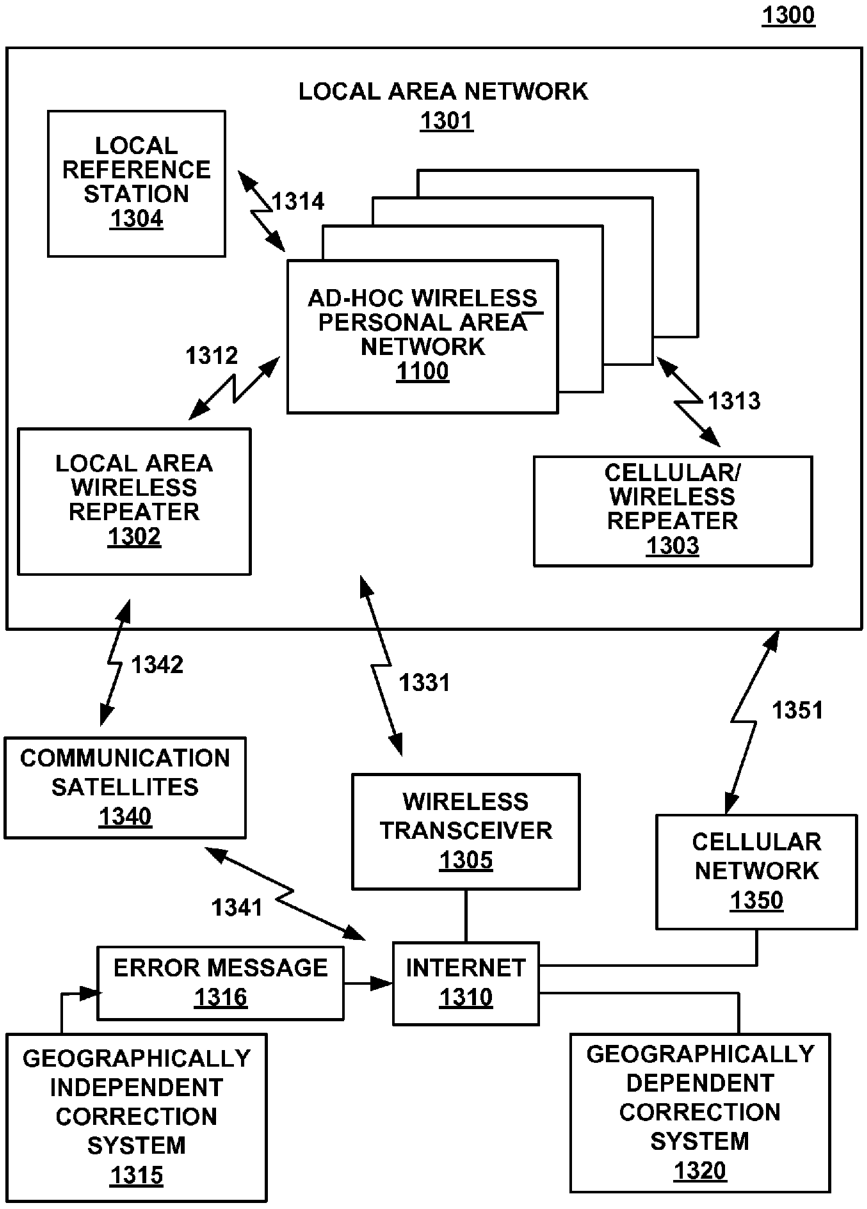
FIG. 13 is a block diagram of an example communication network in accordance with one or more embodiments.

FIG. 13 is a block diagram of an example communication network 1300 in accordance with one or more embodiments. In FIG. 13, one or more ad-hoc wireless personal area networks 1100 are communicatively coupled with local area wireless repeater 1302, cellular/wireless repeater 1303, and local reference station 1304 via wireless connections 1312 and 1313 respectively. As described above, display unit 113 can include wireless radio transceivers (e.g., 1162 of FIG. 11) which are configured for communication outside of ad-hoc wireless personal area network 1100. As an example, implementations of the IEEE 802.11 standards can be used to implement communications between ad-hoc wireless personal area networks 1100, local area wireless repeater 1302, cellular/wireless repeater 1303, and local reference station 1304. In one embodiment, local area network 1301 utilizes a network protocol that implements an IP address based communication scheme to implement communications between various elements. In FIG. 13, local area wireless repeater 1302, cellular wireless repeater 1303, and local reference station 1304 are shown as separate components which represent a fixed infrastructure for implementing local area network 1301. However, in accordance with embodiments some of the functions separately shown in local area network 1301 can be combined in a single device. In one embodiment, a display unit 113 that includes one or more of the different types of ad-hoc wireless personal area networks 1100 can be configured to store and forward messages to/from other of the ad-hoc wireless personal area networks 1100 comprising local area network 1301. Alternatively, local area wireless repeater 1302 may be mounted in another vehicle at a site at which local area network 1301 is located.

In one embodiment, communication between Internet 1310 and local area network 1301 is accomplished via cellular/wireless repeater 1303. In one embodiment, cellular/wireless repeater 1303 comprises a cellular telephone transceiver for communicating with Internet 1310 via cellular network 1350 using wireless connection 1351. Cellular/wireless repeater 1303 further comprises a wireless transceiver for communication with other components of local area network 1301. An example of a commercially available model of cellular/wireless repeater 1303 is the Nomad® handheld computer from Trimble Navigation of Sunnyvale, Calif. In one embodiment, communication between Internet 1310 and local area network 1301 is accomplished via wireless transceiver 1305 which is communicatively coupled with Internet 1310. Wireless transceiver 1305 is in turn communicatively coupled with local area wireless repeater 1302 using wireless connection 1331. It is noted that in accordance with one embodiment, a connection to Internet 1310 may be available at the site at which local area network 1301 is located and that wireless transceiver 1305 may fulfill the function of local area wireless repeater 1302 in that instance. In accordance with another embodiment, a connection to Internet 1310 can be made directly from display unit 113. In operation, display unit 113 can initiate wireless communication with Internet 1310 either directly using wireless radio transceiver 1162, or via local area wireless repeater 1302 and/or cellular/wireless repeater 1303. In one embodiment, establishing communications with Internet 1310 is accomplished in a manner that is transparent to a user of display unit 113. In other words, display unit 113 can be configured to automatically exchange messages with local area wireless repeater 1302, cellular/wireless repeater 1303, or a website of Internet 1310 without the necessity of user initiation or intervention. These messages can be used for receiving updates, position reporting of load 104, or lifting device 120. The data in these messages can be used for purposes including, but not limited to, collision monitoring, traffic control at a site, hazard avoidance, site monitoring, status and position monitoring of equipment, vehicle logging, etc.

In accordance with embodiments, Internet 1310 is coupled with a geographically independent corrections system 1315 and with a geographically dependent correction system 1320. In accordance with various embodiments, it is desired to deliver reference data to GNSS receivers to improve the precision of determining a position. This reference data allows compensating for error sources known to degrade the precision of determining a position such as satellite and receiver clock errors, signal propagation delays, and satellite orbit error. In one embodiment, geographically independent corrections system 1315 determines the correct position of GNSS satellites in space as well as clock errors associated with each of the GNSS satellites and distributes an error message 1316 to facilitate a GNSS receiver to refine determining its position with a precision of ten centimeters or less. In accordance with various embodiments, error message 1316 can be distributed via Internet 1310. In one embodiment, error message 1316 is sent from Internet 1310 to communication satellites 1340 via uplink 1341. Communication satellites 1340 then convey error message 1316 to local area network 1301 via wireless connection 1342. In one embodiment, GNSS receiver 1164 of display unit 113 determines which GNSS satellites are in its field of view and uses the orbit and clock error data pertaining to these satellites from error message 1316 to refine determining its position. Alternatively, error message 1316 can be conveyed from communication satellites 1340 to local area wireless repeater 1302 or cellular/wireless repeater 1303. In another embodiment, error message 1316 is sent via cellular network 1350 to cellular/wireless repeater 1303 and then distributed throughout local area network 1301.

Geographically dependent corrections system 1320 uses a network of reference stations to determine error sources which are more applicable to a particular to the region due to local weather and/or local atmospheric conditions due to ionospheric and/or tropospheric propagation delays. In accordance with one embodiment, a subset of the network of reference stations can be selected in order to generate reference data descriptive of these error sources. This reference data can be used by GNSS receiver 1164 to refine determining its position with a precision of approximately one centimeter or less. Again, the reference data descriptive of these error sources can be distributed via Internet 1310 to communication satellites 1340, or to cellular network 1350 for distribution to local area network via cellular/wireless repeater 1303 for example. One implementation of geographically dependent correction system 1320 is described in U.S. patent application Ser. No. 12/241,451, titled "Method and System for Location-Dependent Time-Specific Correction Data," by James M. Janky, Ulrich Vollath, and Nicholas Talbot, assigned to the assignee of the present invention and incorporated by reference in its entirety herein.

Figure 14:
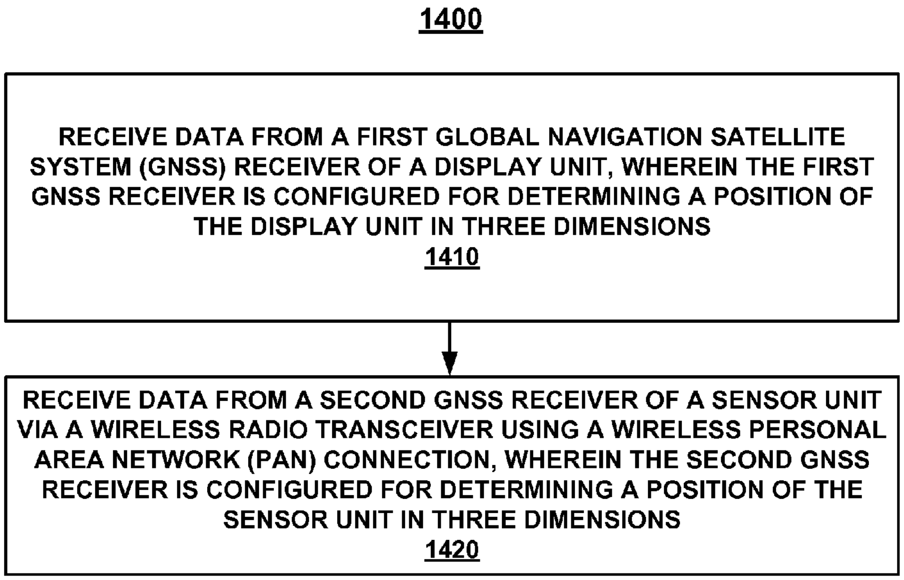
FIG. 14 is a flowchart of a method for communicatively coupling a sensor unit system in accordance with one or more embodiments.

FIG. 14 is a flowchart of a method 1400 for communicatively coupling a sensor unit system in accordance with one or more embodiments. In operation 1410 of FIG. 14, data is received from a first global navigation satellite system (GNSS) receiver of a display unit, wherein the first GNSS receiver is configured for determining a position of the display unit in three dimensions. As described above, in accordance with various embodiments display unit 113 comprises GNSS receiver 1164 which is configured to determine the position of display unit 113 in three dimensions based upon GNSS signals received via GNSS antenna 1165. Furthermore, in accordance with various embodiments display unit 113 further comprises one or more wireless radio transceivers 1165. In accordance with various embodiments, at least one of the wireless radio transceivers 1165 is configured for communicating via a wireless personal area network connection (e.g., 111 of FIG. 11).

In operation 1420 of FIG. 14, data is received from a second GNSS receiver of a sensor unit via a wireless radio transceiver using a wireless Personal Area Network (PAN) connection, wherein the second GNSS receiver is configured for determining a position of the sensor unit in three dimensions. In accordance with various embodiments display unit 113 receives data from hook block sensor assembly 1101 via wireless connection 1111. As described above, wireless connection 1111 is a wireless personal area network connection in accordance with embodiments. In accordance with various embodiments hook block sensor assembly 1101 can convey data from one or more GNSS receiver 1103 via wireless connection 1111. Additionally, hook block sensor assembly 1101 can convey data from one or more of load monitors 214.

Embodiments of the present technology are thus described. While the present technology has been described in particular embodiments, it should be appreciated that the present technology should not be construed as limited to these embodiments alone, but rather construed according to the following claims.

What is claimed is:

1. A lifting device sensor unit, said sensor unit comprising:

a housing configured to removably couple about a load line of a lifting device;

a load monitor coupled with said housing and configured for monitoring a load coupled with said load line, including monitoring a load position and a load orientation of said load; and a wireless transceiver coupled with said housing and configured for wirelessly providing information including said load position and said load orientation to a display unit located apart from said sensor unit.

2. The sensor unit of claim 1, further comprising:

a first global navigation satellite system (GNSS) receiver coupled with said housing and configured for determining a sensor unit position in three dimensions; and wherein said wireless transceiver is further configured for wirelessly providing information including said sensor unit position to said display unit.

3. The sensor unit of claim 2, further comprising:

an inertial sensor coupled with said housing and configured for augmenting said first GNSS receiver in determining said sensor unit position in three dimensions.

4. The sensor unit of claim 2, further comprising:

a second GNSS receiver coupled with said housing and configured for determining an angular orientation of said sensor unit.

5. The sensor unit of claim 1, further comprising:

a collision monitor coupled with said housing and configured monitoring for collision related hazards in a vicinity of said lifting device.

6. The sensor unit of claim 5, further comprising:

an avoidance action initiator coupled with said housing configured for initiating at least one hazard avoidance action in response to a monitored occurrence of said collision related hazard.

7. The sensor unit of claim 1, further comprising:

a power source coupled with said housing and configured for providing electrical power for operating electrical components of said sensor unit.

8. The sensor unit of claim 7, further comprising:

a power source charger coupled with said housing and configured for generating a charge for charging said power source.

9. The sensor unit of claim 1, further comprising:

a protective bumper disposed on a portion of an external surface of said housing.

10. The sensor unit of claim 1, further comprising:

a load line positioner coupled with said housing and configured for adjustably positioning said sensor unit along said load line.

11. The sensor unit of claim 1, further comprising:

a lift plan generator coupled with said housing and configured for generating a lift plan for lifting said load to a destination associated with said load.

12. The sensor unit of claim 1, wherein said load monitor is selected from the group of a camera, a plurality of cameras, an ultrasonic sensor, a laser scanner, a bar code scanner, a radio frequency identification device transceiver, and an inertial sensor.

13. The sensor unit of claim 1, wherein said load monitor is further configured for monitoring for load related hazards in a vicinity of said load.

14. The sensor unit of claim 1, wherein said load monitor is configured for monitoring for one or more object identifiers coupled with said load or one or more other objects in a field of view of said load monitor from said lifting device sensing unit.

15. The sensor unit of claim 1, wherein said transceiver is further configured for wirelessly communicating with a second lifting device sensor unit coupled with a second lifting device.

16. The sensor unit of claim 1, wherein said transceiver is further configured for accessing load cell information of said lifting device, said load cell information indicative of said lifting device taking or releasing said load with said load line.

17. The sensor unit of claim 1, wherein said housing includes a power source access hatch for accessing a power source of said sensor unit while said sensor unit is coupled with said load line.

18. The sensor unit of claim 1, wherein said housing includes recharge contacts, said recharge contacts accessible for recharging a power source of said sensor unit while said sensor unit is coupled with said load line.

19. The sensor unit of claim 1, wherein at least a portion of said housing is radio frequency transparent to GNSS signals for facilitating receipt of said GNSS signals by a GNSS receiver.

20. The sensor unit of claim 1, wherein said housing comprises at least two portions configured for removably coupling with one another about said load line.

21. A lifting device sensor unit, said sensor unit comprising:

a housing configured to removably couple about a load line of a lifting device;

a load monitor coupled with said housing and configured for monitoring a load coupled with said load line, including monitoring a load position and a load orientation of said load;

a collision monitor coupled with said housing and configured monitoring for collision related hazards in a vicinity of said lifting device; and a wireless transceiver coupled with said housing and configured for wirelessly providing information including said load position, said load orientation, and a monitored occurrence of a collision related hazard, to a display unit located apart from said sensor unit.

22. The sensor unit of claim 21 further comprising:

a first global navigation satellite system (GNSS) receiver coupled with said housing and configured for determining a sensor unit position in three dimensions; and wherein said wireless transceiver is further configured for wirelessly providing information including said sensor unit position to said display unit.

23. The sensor unit of claim 22, further comprising:

an inertial sensor coupled with said housing and configured for augmenting said first GNSS receiver in determining said sensor unit position in three dimensions.

24. The sensor unit of claim 22, further comprising:

a second GNSS receiver coupled with said housing and configured for determining an angular orientation of said sensor unit.

25. The sensor unit of claim 21, further comprising:

an avoidance action initiator coupled with said housing configured for initiating at least one hazard avoidance action in response to said monitored occurrence of said collision related hazard.

26. The sensor unit of claim 21, further comprising:

a power source coupled with said housing and configured for providing electrical power for operating electrical components of said sensor unit.

27. The sensor unit of claim 26, further comprising:

a power source charger coupled with said housing and configured for generating a charge for charging said power source.

28. The sensor unit of claim 21, further comprising:

a protective bumper disposed on a portion of an external surface of said housing.

29. The sensor unit of claim 21, further comprising:

a load line positioner coupled with said housing and configured for adjustably positioning said sensor unit along said load line.

30. The sensor unit of claim 21, further comprising:

a lift plan generator coupled with said housing and configured for generating a lift plan for lifting said load to a destination associated with said load.

31. The sensor unit of claim 21, wherein said load monitor is selected from the group of a camera, a plurality of cameras, an ultrasonic sensor, a laser scanner, a bar code scanner, a radio frequency identification device transceiver, and an inertial sensor.

32. The sensor unit of claim 21, wherein said load monitor is further configured for monitoring for load related hazards in a vicinity of said load.

33. The sensor unit of claim 21, wherein said load monitor is configured for monitoring for one or more object identifiers coupled with said load or one or more other objects in a field of view of said load monitor from said lifting device sensing unit.

34. The sensor unit of claim 21, wherein said transceiver is further configured for wirelessly communicating with a second lifting device sensor unit coupled with a second lifting device.

35. The sensor unit of claim 21, wherein said transceiver is further configured for accessing load cell information of said lifting device, said load cell information indicative of said lifting device taking or releasing said load with said load line.

36. The sensor unit of claim 21, wherein said housing includes a power source access hatch for accessing a power source of said sensor unit while said sensor unit is coupled with said load line.

37. The sensor unit of claim 21, wherein said housing includes recharge contacts, said recharge contacts accessible for recharging a power source of said sensor unit while said sensor unit is coupled with said load line.

38. The sensor unit of claim 21, wherein at least a portion of said housing is radio frequency transparent to GNSS signals for facilitating receipt of said GNSS signals by a GNSS receiver.

39. The sensor unit of claim 21, wherein said housing comprises at least two portions configured for removably coupling with one another about said load line.

* * * * *